United States Patent
Narasimha Swamy et al.

(10) Patent No.: US 12,490,288 B2
(45) Date of Patent: Dec. 2, 2025

(54) USER SCHEDULING USING A GRAPH NEURAL NETWORK

(71) Applicant: Intel Corporation, Santa Clara, CA (US)

(72) Inventors: Vasuki Narasimha Swamy, San Francisco, CA (US); Oner Orhan, San Jose, CA (US); Hosein Nikopour, San Jose, CA (US); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 17/551,257

(22) Filed: Dec. 15, 2021

(65) Prior Publication Data
US 2023/0189317 A1  Jun. 15, 2023

(51) Int. Cl.
*H04W 72/54* (2023.01)
*G06N 3/08* (2023.01)
*H04W 72/542* (2023.01)

(52) U.S. Cl.
CPC ............ *H04W 72/542* (2023.01); *G06N 3/08* (2013.01)

(58) Field of Classification Search
CPC .............................. H04W 72/542; G06N 3/08
See application file for complete search history.

(56) References Cited

U.S. PATENT DOCUMENTS

2019/0005384 A1\* 1/2019 Sundar .................. G06N 3/084
2021/0049202 A1\* 2/2021 Liu .......................... G06F 16/58
2022/0369332 A1\* 11/2022 Wang ................ H04W 72/1263

OTHER PUBLICATIONS

X. Guo et al., "A Novel User Selection Massive MIMO Scheduling Algorithm via Real Time DDGP," Globecom 2020—2020 IEEE Global Communications Conference, 2020, pp. 1-6, doi: 10.1109/ GLOBECOM42002.2020.9322383.
Y. Li et al. "Diffusion convolutional recurrent neural network: Data-driven traffic forecasting," in Proc. of ICLR, 2018.
P. Velickovic et al. "Graph attention networks," in Proc. ICLR, Feb. 4, 2017, pp. 1-12.

\* cited by examiner

*Primary Examiner* — Brenda H Pham
(74) *Attorney, Agent, or Firm* — Viering, Jentschura & Partner mbB

(57) ABSTRACT

The present disclosure relates to a device for use in a wireless network, the device including: a processor configured to: provide input data to a trained graph neural network model, the input data being indicative of a graph representation of a plurality of wireless communication devices, wherein the trained graph neural network model is configured to provide output data being indicative of a scheduled user set including the plurality of wireless communication devices; and instruct user scheduling of the plurality of wireless communication devices based on the output data of the trained graph neural network model.

17 Claims, 14 Drawing Sheets

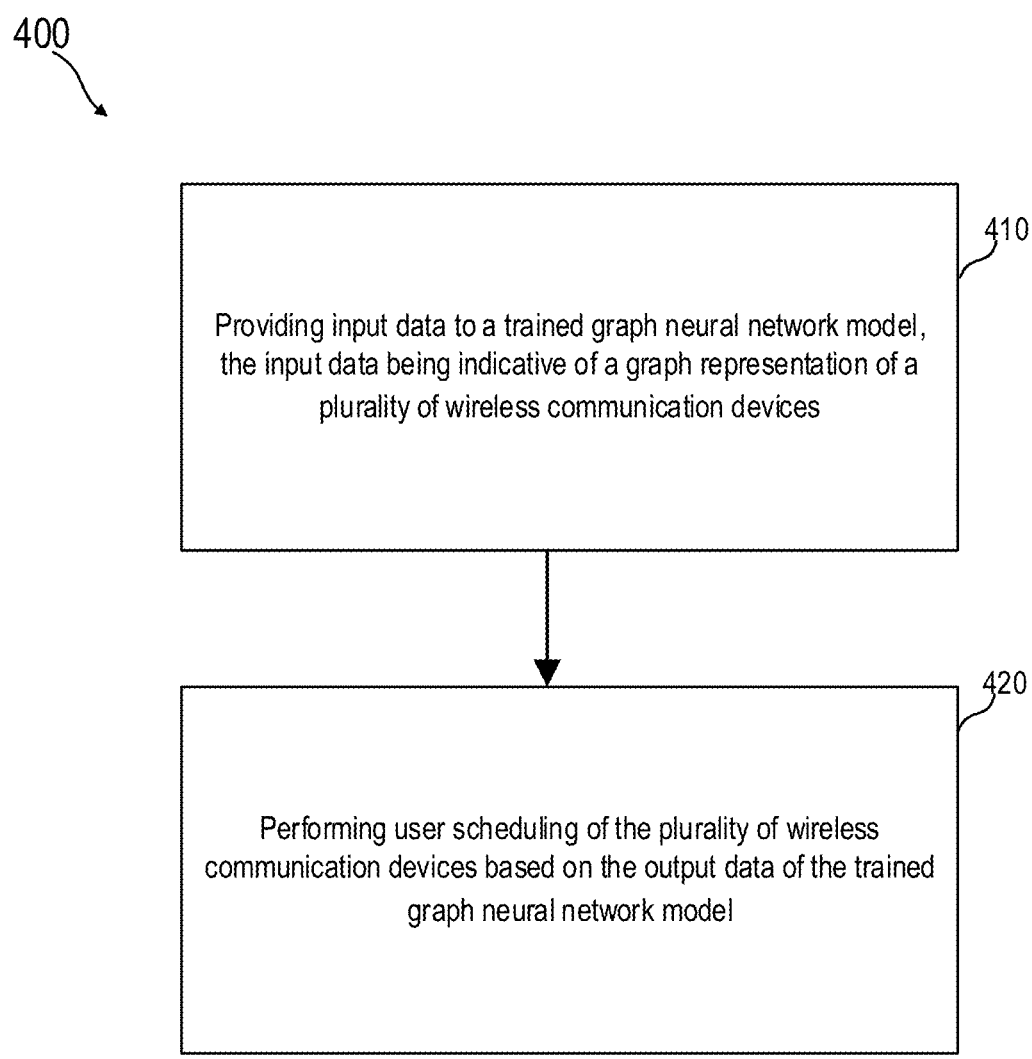

USER SCHEDULING USING A GRAPH NEURAL NETWORK

TECHNICAL FIELD

The present disclosure relates to a device for user scheduling in a wireless network, and to methods thereof, e.g. a method of operating a wireless network (e.g., a method of performing user scheduling in a wireless network).

BACKGROUND

In general, various technologies and standards have been developed for wireless communication, which is at the basis of a variety of services and applications in everyday life, such as the consumption of entertainment content via streaming services, the implementation of automated driving functionalities via exchange of information with a road infrastructure, or the design of Internet of Things environments in an industrial or in a home setting, as examples. Software and hardware components of wireless networks are continuously evolving to satisfy the ever increasing number of connected users, and to ensure a fast and efficient transfer of information to and from the users. An important aspect of the operation of a wireless network is the allocation of resources to the users. In case multiple users wish to transmit and/or receive data at the same time, smart solutions are needed to distribute the available resources among the users in a fair manner, while ensuring adequate quality in terms of latency, data rate in downlink and uplink, and the like. The development of advanced strategies for performing user scheduling in a wireless network is thus of fundamental importance for the overall performance of wireless communications.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIG. 4A and FIG. 4B each shows a flow diagram of a method of performing user scheduling in a wireless network by using a graph neural network according to the present disclosure.

DESCRIPTION

Figure 1A:
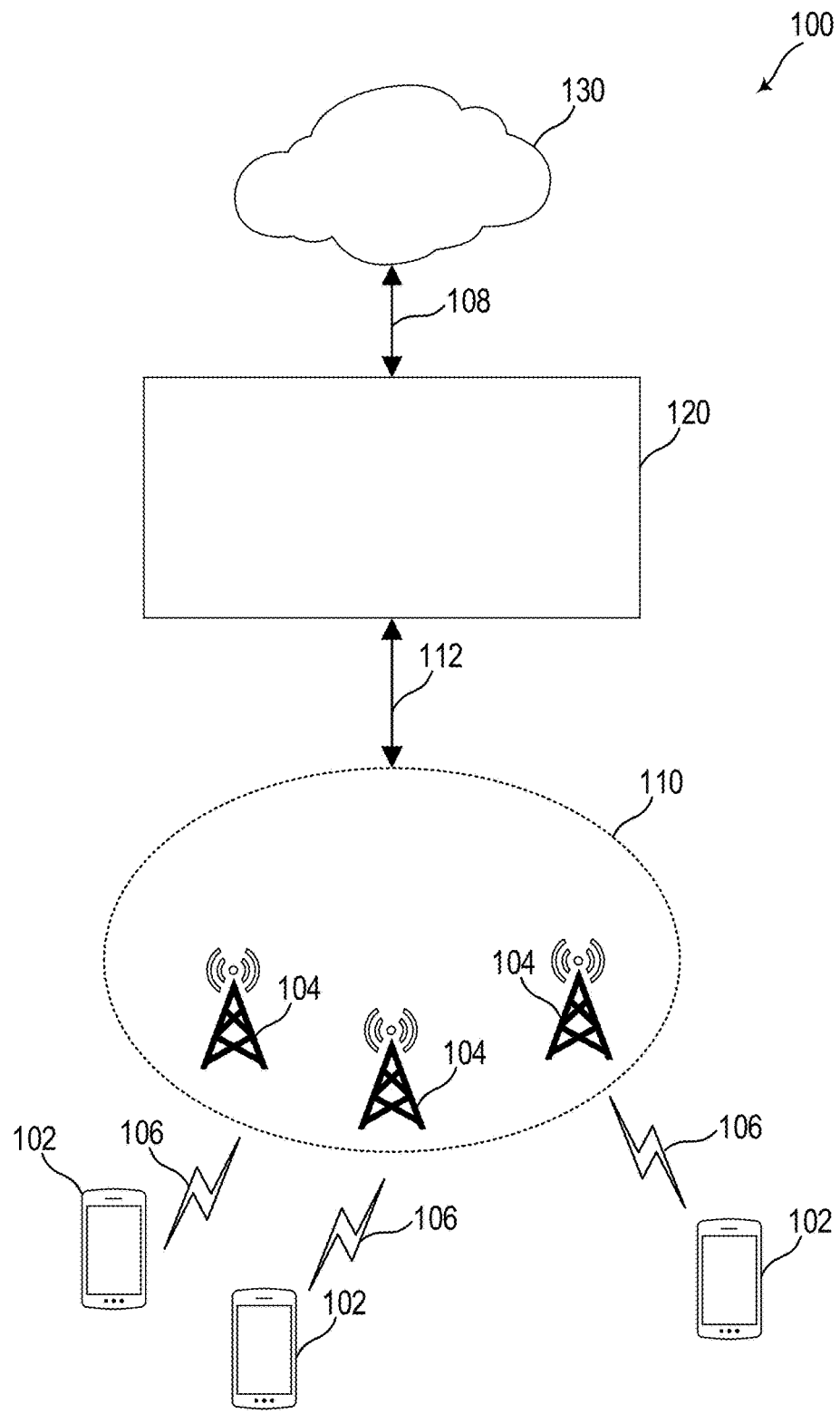
FIG. 1A shows a wireless network in a schematic representation according to the present disclosure.

The following detailed description refers to the accompanying drawings that show, by way of illustration, specific details and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects may be combined with one or more other aspects to form new aspects. Various aspects are described in connection with methods and various aspects are described in connection with devices (e.g., a device for use in a wireless network, a network access node, a wireless communication device, etc.). However, it may be understood that aspects described in connection with methods may similarly apply to the devices, and vice versa.

Next generation wireless networks are expected to run efficiently on general purpose processors to enable virtual radio access network (vRAN). Cost effective and flexible management of wireless access networks will thus play an important role to ensure reliable and satisfactory performance of the networks. However, as demand of data rate and the number of connected devices increase over time, traditional methods based on small scale optimal or even heuristic greedy solutions suffer from high complexity or significant performance loss.

One emerging problem for next generation wireless networks is user scheduling for multi-user (massive) multiple-input and multiple-output (MU-MIMO) systems. Conventional approaches rely for example on greedy scheduling algorithms, which implement a strategy where users are picked one at a time to make a group. The best user is picked first, followed by the second-best user that makes the best 'pair' with the already picked first user and so on. This approach, even if widely adopted, suffers from high complexity and low performance, as discussed in further detail below (see also FIG. 2D). There are also emerging approaches based on neural network solutions that use artificial intelligence techniques to pick users, but these strategies are not widely used yet, as they are not resilient against dynamic number of active users and varying channel conditions such as rank of channel and signal-to-interference-and-noise ratio (SINR).

The present disclosure is based on the realization that graph neural networks (GNNs) have an architecture that is particularly well suited to address the task of user scheduling in a wireless network. Illustratively, the present disclosure is based on the realization that a graph representation that may be fed as input to a graph neural network provides a scalable and comprehensive characterization of the interactions among users within the wireless network (e.g., within a same cell, or served by a same network access node). The present disclosure is thus related to performing user scheduling in a wireless network using the output of a graph neural network. Compared to other types of scheduling strategies (e.g., a naive algorithm, a greedy algorithm, or a linear neural network, as examples), the GNN-based approach described herein allows determining the allocation of resources to users in a more time- and resource-efficient manner.

The use of a graph neural network allows to obtain a representation of the interplays among the network and the users to determine a scheduling order that provides fair and high-quality data transmission to and from the users. The GNN-approach may provide a one-shot user group selection solution, rather than a lengthy and resource-intensive iteration over possible user grouping configurations as with other scheduling strategies. The GNN-approach has thus the potential to scale with user pool size, while reducing complexity and processing time. The approach described herein may also provide a user group selection that results in better weighted sum rate than greedy algorithms.

The present disclosure relates to a device configured to perform user scheduling in a wireless network by using the output of a graph neural network. Illustratively, the present disclosure relates to a (computer-implemented) method of performing user scheduling in a wireless network by using the output of a graph neural network, e.g. relates to the use of a graph neural network for performing user scheduling in a wireless network.

The present disclosure relates to a device for use in a wireless network, the device including: a processor configured to provide input data to a trained graph neural network model, the input data being indicative of a graph representation of a plurality of wireless communication devices, wherein the trained graph neural network model is configured to provide output data indicative of a scheduled user set including the plurality of wireless communication devices; and instruct scheduling of the plurality of wireless communication devices based on the output data of the trained graph neural network model. As an exemplary configuration, the device may further include a memory storing instructions for execution by the processor, e.g. the memory may store the trained graph neural network model, and/or the input data provided to the trained graph neural network model, and/or the output data from the trained graph neural network model.

The use of a trained graph neural network model provides thus extracting complex features from a current wireless network scenario in a fast manner, and enables a scalable, intelligent, and low complexity approach to user scheduling. Illustratively, the architecture of a graph neural network allows to obtain a collective picture of the network and the relationships among the wireless communication devices, to determine how to schedule the users in a single shot.

The present disclosure further relates to a method of operating a wireless network (e.g., a method of performing user scheduling in a wireless network), the method including: providing input data to a trained graph neural network model, the input data being indicative of a graph representation of a plurality of wireless communication devices, wherein the trained graph neural network model is configured to provide output data indicative of a scheduled user set including the plurality of wireless communication devices; and performing scheduling of the plurality of wireless communication devices based on the output data of the trained graph neural network model.

The present disclosure further relates to a computer-implemented method of training a graph neural network used for user scheduling in a wireless network, the method including: using the graph neural network to determine a scheduled user set including a plurality of wireless communication devices; performing user scheduling based on the determined scheduled user set; receiving a reward representative of a quality of resource allocation for the performed user scheduling; and adjusting values of parameters of the graph neural network using the reward.

The term "wireless network" as used herein, e.g. in reference to a communication network such as a mobile communication network, encompasses both an access section of a network (e.g., a radio access network (RAN) section) and a core section of a network (e.g., a core network section). A wireless network may provide communication and other types of services to one or more wireless communication devices, e.g. through network access nodes. A wireless network may be or may include a communication network in which the final communication link (e.g., to a wireless communication device) is wireless, e.g. over an air interface. In a given location one or more wireless networks may be deployed, each supporting a radio access technology (RAT) and operating in a respective frequency range. A "wireless network" may also be referred to herein as "radio communication network" or "wireless system".

The term "network access node" as used herein refers to a network-side device that provides an access network (e.g., a radio access network). A "network access node" may allow wireless communication devices to connect and exchange information with a core network and/or external data networks through the network access node. A "network access node" may thus be or include any device that may be configured to allow a wireless communication device to access a wireless network. A "network access node" may provide coverage for a macro cell, a micro cell, a pico cell, a femto cell, and/or another type of cell of the wireless network. A "network access node" may include any type of base station or access point, including macro base stations, micro base stations, NodeBs, evolved NodeBs (eNBs), New Radio NodeBs (gNBs), Home base stations, Remote Radio Heads (RRHs), relay points, Wi-Fi/WLAN Access Points (APs), Bluetooth master devices, dedicated short-range communication roadside units (DSRC RSUs), wireless communication devices acting as network access nodes, multi-standard radio (MSR) equipment, and any other electronic device capable of network-side wireless communications, including both immobile and mobile devices (e.g., vehicular network access nodes, moving cells, and other movable network access nodes). A network access node may include any suitable combination of hardware and/or software to perform the tasks, features, functions and methods disclosed herein. A "network access node" may also be referred to herein as "RAN node", or simply as "network node".

The term "wireless communication device" as used herein refers to user-side devices (both portable and fixed) that may connect to a core network and/or external data networks via an access network, e.g. through a network access node. A "wireless communication device" may be configured to communicate wirelessly with other wireless communication devices and/or with a network access node of a wireless network. A wireless communication device may communicate with a network access node via downlink and uplink. "Downlink" may describe the communication link from the network access node to the wireless communication device, and "uplink" may describe the communication link from the wireless communication device to the network access node.

A "wireless communication device" may be or may include any mobile or immobile wireless communication device, including User Equipment (UEs), Mobile Stations (MSs), Stations (STAs), cellular phones, gaming consoles, tablets, laptops, personal computers, wearables, multimedia playback and other handheld or body-mounted electronic devices, consumer/home/office/commercial appliances (e.g., a smart television, a smart refrigerator, etc., in an Internet of Things implementation), vehicles (e.g., a car, or a drone), a robot, and any other electronic device capable of user-side wireless communications. Without loss of generality, in some cases wireless communication devices may also include application-layer components, such as application processors or other general processing components that are directed to functionality other than wireless communications. A wireless communication device may optionally support wired communications in addition to wireless communications. Furthermore, wireless communication devices may include vehicular communication devices that function as wireless communication devices. Certain communication devices may act both as wireless communication devices and network access nodes, such as a wireless communication device that provides network connectivity for other wireless communication devices. A "wireless communication device" may also be referred to herein as "terminal device" (to indicate that the wireless communication device represents the end terminal of a wireless connection), or simply as "wireless device".

The term "user" may be used herein in general to indicate a user of a wireless network, e.g. to indicate a "user of a wireless communication device" or to indicate a wireless communication device itself communicating or attempting to communicate with the wireless network. Illustratively, a "user" in the context of a wireless network may be understood as an entity that may access the wireless network and communicate via the wireless network. A "user" may be, for example, a person, e.g. the owner of a mobile phone, a smartphone, a tablet, etc. A user may however also be a technological entity, e.g. a wireless communication device itself, for example a robot, a smart sensor, a vehicle, etc. that may access the wireless network and communicate via the wireless network independently of the presence of a human operating or otherwise controlling the technological entity.

The term "network scenario" as used herein may describe a state of a wireless network, e.g. at a given time point, for example in relation to communication occurring over the wireless network. A "network scenario" as used herein may refer to one or more properties of an operating scenario of the wireless network, e.g. to a number of users, downlink/uplink requirements of the users, data rate, cell occupation, and the like. Illustratively, a "network scenario" may include one or more communication-related properties (e.g., one or more communication-related metrics) representative of wireless communication at the wireless network at a given time point. A "network scenario" as used herein may refer to an operating scenario of a cell or a network access node of the wireless network, as examples. A "network scenario" may also be referred to herein as "network environment". For example, a "network scenario" may be or include a "radio access network scenario", e.g. the scenario of the "access network" portion of a wireless network.

The term "scheduling" is used herein as commonly understood in the context of wireless communications. In general "scheduling" may refer to the allocation of communication resources (e.g., bandwidth, latency, and the like) to users of a wireless network according to some scheme or order. The allocation of communication resources may include, for example, assigning part of the bandwidth available for communication to data transmission to and/or data reception from a wireless communication device. A scheduling method (e.g., a scheduling algorithm) may determine an order of the users based on one or more predefined metrics, for example based on channel quality or waiting time of the users. A scheduling method may thus provide a scheduled set in which the users are listed in order of priority for resource allocation. Resources (e.g., bandwidth) may be first allocated to the user with the highest priority, then to the user with the second highest priority (after the user with the highest priority has completed data transmission/reception, or in parallel if enough resources are available), then to the third highest priority, etc. Examples of conventional scheduling algorithms may include a round robin algorithm, a proportional fair algorithm, and delay-based or delay-sensitive algorithms. "Scheduling" may also be referred to herein as "user scheduling", and a "scheduled set" may also be referred to herein as "scheduled user set". "Scheduling" may also be referred to herein as "grouping" or "user grouping", and a "user set" may also be referred to herein as "user group".

In the context of the present disclosure it is understood that references to a wireless network, to user scheduling in a wireless network, and to using a graph neural network for determining a scheduled user set, etc. may refer to a real-world scenario, i.e. to a wireless network existing in the real-world (illustratively, in the physical world) and to scheduling of real-world users. It is however understood that, in principle, the scheduling strategy described herein could also apply to a virtual-world wireless network, illustratively to perform user scheduling of virtual users in a virtual environment. A virtual-world wireless network may for example be or include a computer-implemented simulation of a wireless network, in which the components and the interactions of the virtual wireless network are computer-simulated to represent the corresponding real-world components and interactions of a corresponding real-world wireless network. A virtual-world wireless network may be part of a simulation environment, a video game, or a virtual reality implementation, as examples.

In the present disclosure, various aspects are described with terminology that may pertain to particular radio communication technologies, e.g. with terminology that may pertain to the 5G context. It is however understood that the aspects described herein may correspondingly apply to other radio communication technologies, in which same (e.g., structurally same and/or functionally same) components, structures, operations, logic entities, etc. may be referred to with other terms pertaining to the other radio communication technologies.

FIG. 1A shows a wireless network 100 in a schematic representation according to the present disclosure. The wireless network 100 may communicate with one or more wireless communication devices 102 via one or more network access nodes 104, e.g. over a physical interface 106 (e.g., an air interface). It is understood that the number of network access nodes 104 and wireless communication devices 102 in wireless network 100 is exemplary and is scalable to any amount.

The wireless network 100 may communicate with the one or more wireless communication devices 102 via various mechanisms. In an exemplary configuration, the wireless network 100 may be an ad-hoc network, which may be self-organizing, i.e., the ad-hoc network may be composed of devices that are not pre-configured to have certain roles. Any device may independently become part of wireless network 100, such as via self-configuration and/or registration with other devices. The ad-hoc network may include heterogeneous devices or homogenous devices. Homogeneous devices may all have the same properties, such as computational power, communication rate, communication technologies, etc. Heterogeneous devices on the other hand, may have varying properties.

In the following, the wireless network 100 will be described with particular reference to the cellular context. It is however understood that the description of the wireless network 100 may correspondingly apply to other configurations of the wireless network, e.g. in the case that the wireless network 100 is or includes a sound wave access network (with communication based on sound waves), or an optical access network (with communication based on visible or non-visible light). Furthermore, in the following some configurations of the wireless network 100 may be described in relation to particular radio access network contexts (e.g., 5G, O-RAN, etc.); it is however understood that the description of the wireless network 100 may correspondingly apply to other contexts and other types or configurations of a (radio) access network.

Considering the cellular context, the one or more wireless communication devices 102 may be or may include cellular terminal devices (e.g., Mobile Stations (MSs), User Equipment (UEs), or any type of cellular terminal device). The one or more network access nodes 104 may be or may include base stations (e.g., eNodeBs, NodeBs, gNodeBs, Base Transceiver Stations (BTSs), or any other type of base station). The one or more network access nodes 104 may be part of an access network 110 (e.g., a radio access network) of the wireless network 100. The access network 110 may be, for example, an Evolved Universal Mobile Telecommunications System (UMTS) Terrestrial Radio Access Network (E-UTRAN), a NextGen RAN (NG RAN), an O-RAN, a virtual RAN (vRAN), or some other type of RAN. The wireless network 100 may be a heterogeneous network including network access nodes 104 of different types, such as macro base stations, micro base stations, pico base stations, femto bases stations, etc. Considering an exemplary short-range context, as an alternative, the one or more network access nodes 104 may be or may include access points (APs, e.g., WLAN or WiFi APs), while the one or more wireless communication devices 102 may be or may include short range terminal devices (e.g., stations, STAs). In the short-range context, the one or more network access nodes 104 may interface (e.g., via an internal or external router) with one or more external data networks.

In accordance with some radio communication network technologies, the one or more wireless communication devices 102 may execute mobility procedures to connect to, disconnect from, and switch between available network access nodes 104 of the access network 110. Wireless communication devices 102 may be configured to select and re-select between the available network access nodes 104 in order to maintain a strong radio access connection with the access network 110.

Considering the cellular context, the wireless network 100 may further include a core network 120, with which the one or more network access nodes 104 may interface, e.g. via backhaul interfaces. The core network 120 may be or may include an Evolved Packet Core (EPC, for LTE), Core Network (CN, for UMTS), 5G core network (5GC), as examples, or other cellular core networks. The core network 120 may interface with one or more external data networks 130, e.g. via a suitable interface 108 (e.g., a N6 interface). The core network 120 may provide switching, routing, and transmission, for traffic data related to wireless communication devices 102, and may further provide access to various internal data networks (e.g., control nodes, routing nodes that transfer information between other wireless communication devices on wireless network 100, etc.) and external data networks 130 (e.g., data networks providing voice, text, multimedia (audio, video, image), and other Internet and application data). As an example, the one or more external data networks 130 may include one or more packet data networks, PDNs. A wireless communication device 102 may thus establish a data connection with external data networks 130 via a network access node 104 and core network 120 for data transfer and routing.

The access network 110 and core network 120 may be governed by communication protocols that can vary depending on the specifics of wireless network 100. Such communication protocols may define the scheduling, formatting, and routing of both user and control data traffic through wireless network 100, which includes the transmission and reception of such data through both the radio access and core network domains of wireless network 100. Accordingly, wireless communication devices 102 and network access nodes 104 may follow the defined communication protocols to transmit and receive data over the radio access network domain of wireless network 100, while the core network 120 may follow the defined communication protocols to route data within and outside of the core network 120. Exemplary communication protocols include LTE, UMTS, GSM, WiMAX, Bluetooth, WiFi, mmWave, etc., any of which may be applicable to wireless network 100.

Illustratively, the one or more network access nodes 104 (and, optionally, other network access nodes of wireless network 100 not explicitly shown in FIG. 1A) may accordingly provide a (radio) access network 110 to wireless communication devices 102 (and, optionally, other wireless communication devices of wireless network 100 not explicitly shown in FIG. 1A). In an exemplary cellular context, the (radio) access network that the one or more network access nodes 104 provide may enable the one or more wireless communication devices 102 to wirelessly access the core network 120 via radio communications.

The core network 120 may include one or more core network nodes (not shown in FIG. 1A) configured to implement various functionalities associated with the core network 120, depending on the radio communication technology context. As examples, the core network 120 may include one or more of: a network interface, a broadcast multicast service center (BM-SC), a mobility management entity (MME), a packet data network (PDN) gateway, a visitor location register (VLR), a multimedia broadcast multicast service (MBMS) gateway, a gateway mobile switching center (GMSC), an access and mobility management function (AMF), a session management function (SMF), a user plane function (UPF), a policy control function (PCF), a signaling gateway (SGW), a unified data management (UDM), a network slice selection function (NSSF), an authentication server function (AUSF), an application function, and/or the like.

The one or more network access nodes 104 may be configured to perform various functions of the access network 110, such as uplink and downlink management, data packet scheduling, radio network controller, ciphering and deciphering, handover, synchronization, and/or the like. The one or more network access nodes 104 may be communicatively coupled to the core network 120 via a suitable interface 112, e.g. a S1 interface (for example including a S1-U interface and a serving gateway, S-GW). The one or more network access nodes 104 may communicate with each other, e.g. directly or indirectly, via wired or wireless communication links.

In an exemplary configuration, the access network 110 may be configured according to the Open Radio Access Network or Open RAN concept, e.g. the access network 110 may be or may include an ORAN (also referred to herein as O-RAN). Illustratively, in this exemplary configuration the access network 110 may include non-proprietary hardware and software components, based on open interfaces and standards.

Considering the Open RAN concept, the access network 110 may include: a radio unit (RU, or O-RU to describe the network function) configured to transmit, receive, amplify, and digitize radio frequency signals; and a baseband unit (BBU), which may include a distributed unit (DU, or O-DU to describe the network function) configured to carry out baseband processing functions (e.g., in real-time), and a centralized unit (CU, or O-CU to describe the network function) configured to carry out packet processing functions (e.g., on a longer time scale with respect to the distributed unit). Illustratively, the distributed unit may be configured to run the radio link control and medium access control (MAC) layers. The centralized unit may be configured to control the distributed unit, and to run radio resource control protocol. The interfaces between the various components (e.g., the RU, DU, CU) may be non-proprietary (illustratively, open), which may allow the DU and CU to be implemented as virtualized software functions, as an example. The centralized unit may be split into a centralized unit for the user plane and a centralized unit for the control plane. As an exemplary scenario, a distributed unit may be implemented at a network access node 104 (or in general not at a core network location), whereas a centralized unit may be implemented at a network access node 104 or at a more central location in the network.

Considering the Open RAN concept, the access network 110 may include a management-side and a radio-side. The management-side may be configured to implement management functions of the RAN. The management-side (also referred to as service management and orchestration framework) may include a non-real time RAN intelligent controller (non-real time RIC) configured to implement non-real time control of RAN components and resources. The radio-side may be configured to implement functions on a shorter time scale. The radio-side may include centralized unit, distributed unit, and radio unit described above. The radio-side may further include a near-real time RAN intelligent controller (near-real time RIC) configured to carry out near-real time control of RAN components and resources. In the near-real time RIC one or more software plug-in may be implemented, referred to as xAPP(s), which may be configured to instruct various functionalities of the near-real time RIC.

The GNN-based user scheduling described herein may be particularly well suited for applications in an ORAN context, in which a radio access network may include hardware and software components from different suppliers, in view of the flexibility and scalability of resource management that the GNN-based approach provides. It is however understood that the GNN-based approach described herein may be applied also to other access network types or configurations.

In the following, in relation to FIG. 1B and FIG. 1C, exemplary configurations of a wireless communication device and a network access node will be described. In general, the configuration of a wireless communication device and/or a network access node for wireless communications may be known in the art. A brief description is provided herein to introduce a context for the present disclosure.

Figure 1B:
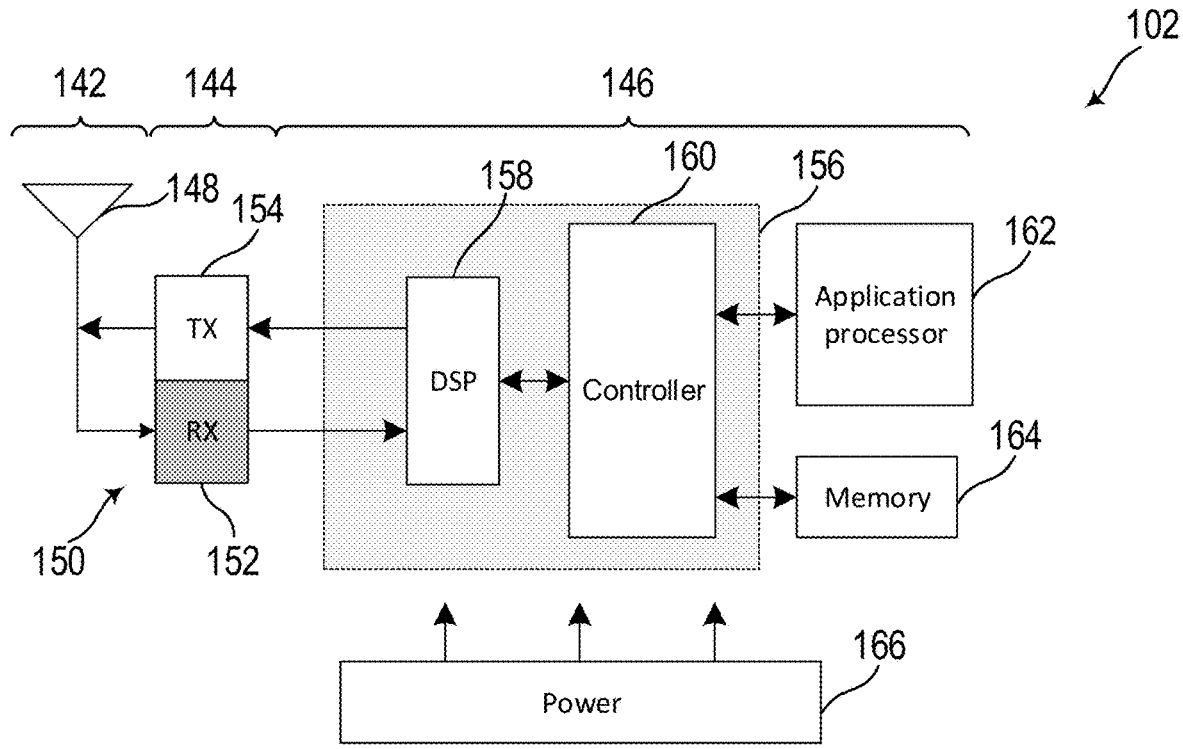
FIG. 1B shows a wireless communication device in a schematic representation according to the present disclosure.

FIG. 1B shows a wireless communication device 102 in a schematic representation according to the present disclosure. In general, a wireless communication device 102 may include an antenna system 142 (also referred to herein as antenna circuitry), transceiver system 144 (also referred to herein as transceiver circuitry), and a processing system 146 (also referred to herein as signal processing circuitry). In the following a description of exemplary components for the various sections 142, 144, 146 of the wireless communication device 102 will be provided.

It is understood that the configuration illustrated in FIG. 1B is exemplary, and a wireless communication device 102 may include additional, less, or alternative components with respect to those shown. As examples, the wireless communication device 102 may include one or more additional hardware and/or software components depending on its configuration and its intended use, such as processors/microprocessors, controllers/microcontrollers, other specialty or generic hardware/processors/circuits, peripheral device(s), power supply, external device interface(s), subscriber identity module(s) (SIMs), user input/output devices (display(s), keypad(s), touchscreen(s), speaker(s), external button(s), camera(s), microphone(s), etc.), or other related components.

Wireless communication device 102 may be configured to transmit and receive radio frequency signals via the antenna system 142, which may include one or more directional or omnidirectional antennas 148, e.g. a single antenna 148 or an antenna array that includes multiple antennas 148. The one or more antennas 148 may include, for example, dipole antennas, monopole antennas, patch antennas, loop antennas, microstrip antennas, or other types of antennas suitable for transmission of radio frequency signals. As an exemplary configuration, an antenna 148 may have multiple apertures, each of which may be considered as an antenna. In an exemplary configuration, the antenna system 142 may additionally include analog antenna combination and/or beamforming circuitry.

Transceiver system 144 may include a radio frequency (RF) transceiver 150, having a receive (RX) path 152 and a transmit (TX) path 154. The RF transceiver 150 may include analog and digital reception components including amplifiers (e.g., Low Noise Amplifiers (LNAs)), Power Amplifiers (PAs), filters, RF demodulators (e.g., RF IQ demodulators)), and analog-to-digital converters (ADCs), which RF transceiver 150 may utilize to convert radio frequency signals to digital baseband samples. In the receive (RX) path 152, the RF transceiver 150 may be configured to receive analog radio frequency signals from the antenna system 142 and perform analog and digital RF front-end processing on the analog radio frequency signals to produce digital baseband samples (e.g., In-Phase/Quadrature (IQ) samples). In the transmit (TX) path 154, the RF transceiver 150 may be configured to receive digital baseband samples from the processing system 146 (e.g., from a baseband modem 156 of the processing system 146) and perform analog and digital RF front-end processing on the digital baseband samples to produce analog radio frequency signals to provide to the antenna system 142 for wireless transmission. The RF transceiver 150 may thus also include analog and digital transmission components, which RF transceiver 150 may utilize to mix the digital baseband samples received from the processing system 146 and produce the analog radio frequency signals for wireless transmission by the antenna system 142.

The processing system 146 may be configured for transmission and reception processing. The processing system 146 may include, for example, a baseband modem 156 (e.g., including a digital signal processor 158 and a protocol controller 160), an application processor 162, a memory 164, and a power supply 166. The baseband modem 156 may be configured to direct the communication functionality of wireless communication device 102 according to the communication protocols associated with each (radio) access network, and may be configured to execute control over antenna system 142 and RF transceiver 154 to transmit and receive radio signals according to the formatting and scheduling parameters defined by each communication protocol.

The baseband modem 156 may include a digital signal processor 158, which may be configured to perform physical layer (PHY, Layer 1) transmission and reception processing to, in the transmit path 154, prepare outgoing transmit data that the protocol controller 160 provides for transmission via RF transceiver 150, and, in the receive path 152, prepare incoming received data that the RF transceiver 150 provides for processing by the protocol controller 160. Digital signal processor 158 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/de-matching, retransmission processing, interference cancellation, and any other physical layer processing functions.

The wireless communication device 102 may be configured to operate according to one or more radio communication technologies, and the digital signal processor 158 may be responsible for lower-layer processing functions (e.g., PHY, Layer 1) of the radio communication technologies, while the protocol controller 160 may be responsible for upper-layer protocol stack functions (e.g., Data Link Layer/Layer 2 and/or Network Layer/Layer 3). Protocol controller 160 may thus be responsible for controlling the radio communication components of wireless communication device 102 (antenna system 142, RF transceiver 150, and digital signal processor 158) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 160 may be configured to perform both user-plane and control-plane functions to facilitate the transfer of application layer data to and from radio wireless communication device 102 according to the specific protocols of the supported radio communication technology. User-plane functions may include header compression and encapsulation, security, error checking and correction, channel multiplexing, scheduling and priority, while control-plane functions may include setup and maintenance of radio bearers.

In an exemplary configuration, wireless communication device 102 may be configured to transmit and receive data according to multiple radio communication technologies. Accordingly, one or more of antenna system 142, RF transceiver 150, digital signal processor 158, and/or protocol controller 160 may include separate components or instances dedicated to different radio communication technologies and/or unified components that are shared between different radio communication technologies. Accordingly, while antenna system 142, RF transceiver 150, digital signal processor 158, and protocol controller 160 are shown as individual components in FIG. 1B, it is understood that they may encompass separate components dedicated to different radio communication technologies.

The processing system 146 may further include an application processor 162 (e.g., a CPU) and a memory 164. Application processor 162 may be configured to handle the layers above the protocol stack, including the transport and application layers. Application processor 162 may be configured to execute various applications and/or programs of wireless communication device 102 at an application layer of wireless communication device 102, such as an operating system (OS), a user interface (UI) for supporting user interaction, and/or various user applications. The application processor 162 may interface with baseband modem 156 and act as a source (in the transmit path) and a sink (in the receive path) for user data, such as voice data, audio/video/image data, messaging data, application data, basic Internet/web access data, etc. Memory 164 may embody a memory component of wireless communication device 102, such as a hard drive or another such permanent memory device. Although not explicitly depicted in FIG. 1B, the various other components of wireless communication device 102 may additionally each include integrated permanent and/or non-permanent memory components, such as for storing software program code, buffering data, etc.

Figure 1C:
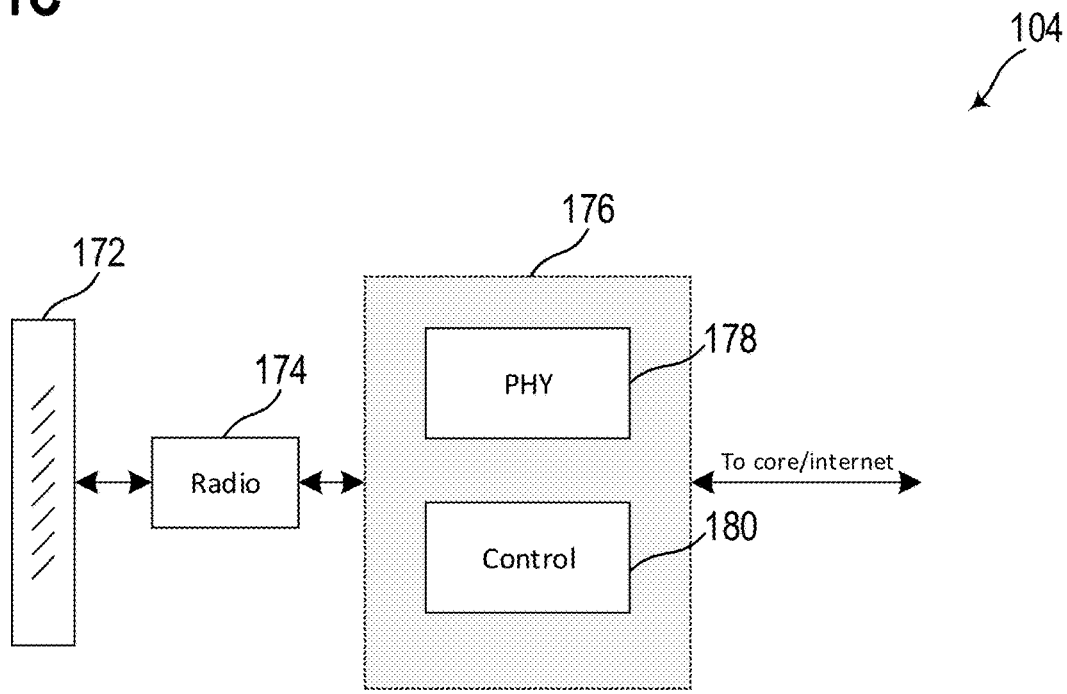
FIG. 1C shows a network access node in a schematic representation according to the present disclosure.

FIG. 1C shows a network access node 104 in a schematic representation according to the present disclosure. As an exemplary application scenario, a network access node 104 may be configured to provide LTE and/or 5G radio services. In general, the network access node 104 may include an antenna system 172 (also referred to herein as antenna circuitry), transceiver system 174 (also referred to herein as transceiver circuitry), and a baseband system 176 (e.g., including a physical layer processor 178 and a protocol controller 180)

In an abridged overview of the operation of network access node 104, network access node 104 may be configured to transmit and receive radio frequency signals via antenna system 172, which may be an antenna array including multiple antennas. Radio transceiver 174 may be configured to perform transmit and receive RF processing to convert outgoing baseband samples from baseband subsystem 176 into analog radio signals to provide to antenna system 172 for radio transmission, and may be configured to convert incoming analog radio signals received from antenna system 172 into baseband samples to provide to baseband subsystem 176. Physical layer processor 178 may be configured to perform transmit and receive PHY processing on baseband samples received from radio transceiver 174 to provide to controller 180, and may be configured to perform transmit and receive PHY processing on baseband samples received from controller 180 to provide to radio transceiver 174. Controller 180 may be configured to control the communication functionality of network access node 104 according to the corresponding radio communication technology protocols, which may include exercising control over antenna system 172, radio transceiver 174, and physical layer processor 178.

In an exemplary configuration, the network access node 104 may be configured to serve one or more wireless communication devices using beamforming techniques and/or coordinated spatial techniques, e.g. may be configured to transmit a beamformed signal to a wireless communication device in one or more directions.

Network access node 104 may thus be configured to provide the functionality of network access nodes in wireless networks by providing an access network to enable served wireless communication devices to access communication data. For example, network access node 104 may also interface with a core network, one or more other network access nodes, or various other data networks and servers via a wired or wireless backhaul interface.

Figure 1D:
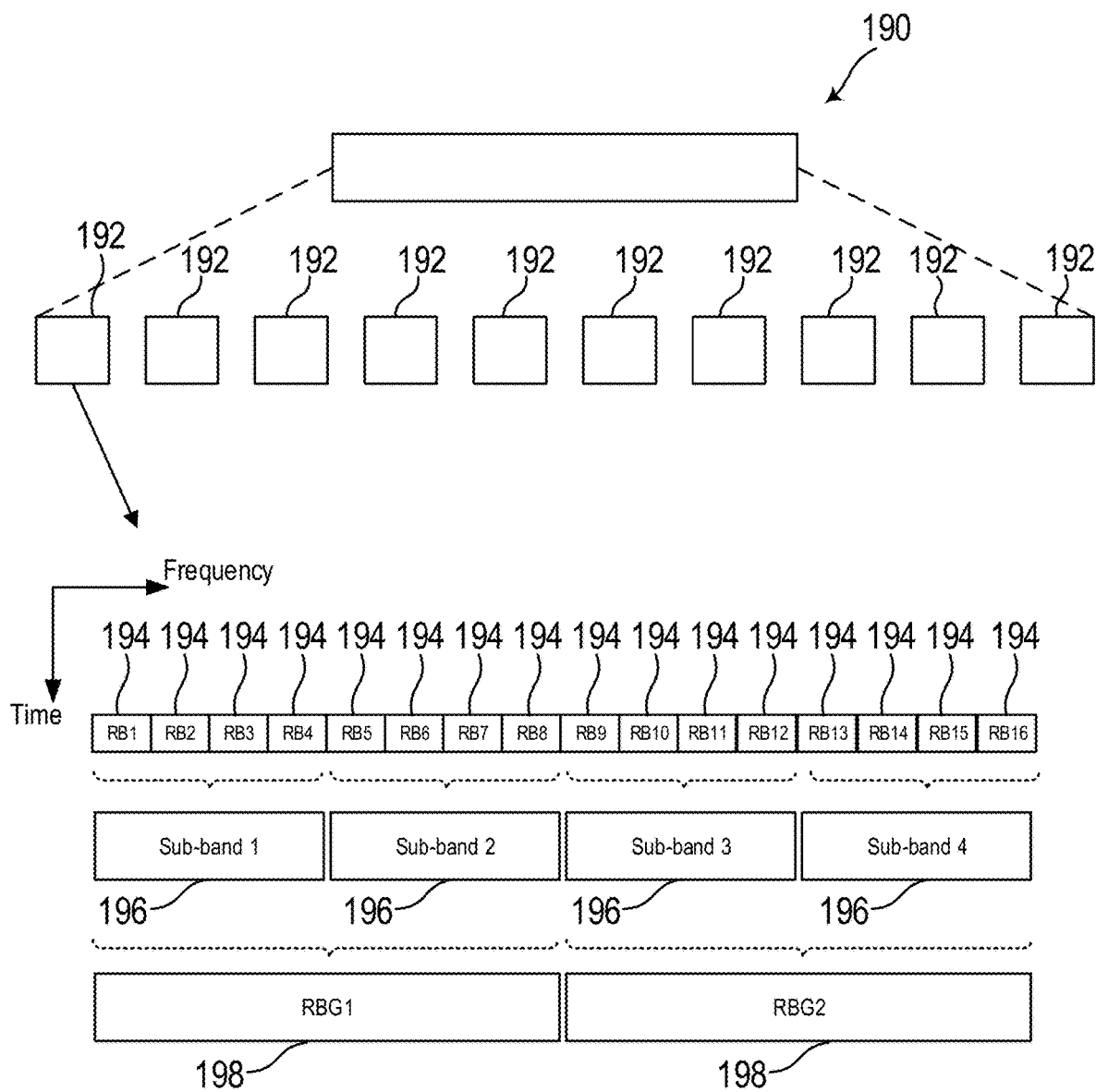
FIG. 1D shows a structuring of wireless communication in a wireless network in a schematic representation according to the present disclosure.

FIG. 1D shows a structuring of communication in a wireless network in a schematic representation according to the present disclosure. Illustratively, FIG. 1D shows an exemplary configuration of a frame 190 for data communication in a wireless network. In relation to FIG. 1D, the structuring of communication will be described with particular reference to a 5G configuration of a wireless network, which may provide enhanced flexibility, but it is understood that the discussion may apply in a corresponding manner to structuring in wireless networks configured according to other radio communication technologies. Furthermore, the structuring of communication will be described with particular reference to orthogonal frequency-division multiplexing (OFDM) and orthogonal frequency-division multiple access (OFDMA), but it is understood that the discussion may apply in a corresponding manner to other access strategies (e.g., single-carrier frequency-division multiple access, SC-FDMA, as another example). Finally, it is understood that the frame structure described herein is exemplary, and communication in a wireless network may be configured according to other types of frame structures (e.g., with different number of sub-frames, different duration, etc.). The following discussion may apply in a corresponding manner to downlink communication and uplink communication.

The configuration of a frame 190 may be dependent on a spectrum usage technique that the wireless network implements. As examples, a frame 190 may be configured according to a frequency-division duplexing (FDD) or according to a time-division duplexing (TDD) usage scheme. A frame configured according to FDD may be referred to as type 1 frame structure, and a frame configured according to TDD may be referred to as type 2 frame structure.

A frame 190 may be a unit of data transmission of the wireless network. A frame 190 may have a predefined duration in time (also referred to herein as length), for example 10 ms (e.g., for LTE and 5G context). A frame 190 may include (e.g., may be sub-divided into) a plurality of sub-frames 192 in the time domain. As a numerical example, a frame 190 may include ten sub-frames 192 (e.g., for LTE and 5G context), each sub-frame 192 having a duration of 1 ms. The time dedicated to transmitting a single sub-frame 192 is referred to as Transmission Time Interval (TTI), which may be a minimum unit for scheduling.

A sub-frame 192 may be further divided into one or more slots in the time domain (also referred to herein as time slots), according to the numerology supported by the radio communication technology. As a numerical example, considering the 5G context, a sub-frame 192 may include 1 slot (corresponding to 10 slots per frame), 2 slots (corresponding to 20 slots per frame), 4 slots (corresponding to 40 slots per frame), 8 slots (corresponding to 80 slots per frame), or 16 slots (corresponding to 160 slots per frame). The duration of a slot (also referred to as the length of a slot) may vary depending on the number of slots in a sub-frame and on the predefined length of the sub-frame (e.g., a slot may have a length of 1 ms, 0.5 ms, 0.25 ms, 0.125 ms, or 0.0625 ms considering the exemplary numbers of slots per sub-frame and a duration of 1 ms mentioned above).

A single slot may include a plurality of communication symbols in the time domain, depending on the access strategy for downlink/uplink. As an example, a slot may include a plurality of OFDM symbols. As another example, a slot may include a plurality of SC-FDMA symbols. As numerical examples, a slot may include fourteen symbols (e.g., 14 OFDM symbols, for example in case of OFDM with normal cyclic prefix), or a slot may include twelve symbols (e.g., 12 OFDM symbols, for example in case of OFDM with extended cyclic prefix), considering the 5G context. Considering the LTE context, as another example, a slot may include 7 OFDM symbols in case of OFDM with normal cyclic prefix, or 6 symbols in case of OFDM with extended cyclic prefix.

Each communication symbol may include one or more sub-carriers, depending on the modulation strategy used for communication (e.g., an OFDM symbol may include 128, 256, 512, 1024, 1536, or 2048 sub-carriers, as numerical examples). The length of a slot in a sub-frame may also be dependent on the sub-carrier spacing (in frequency) supported by the radio communication technology. As numerical examples, e.g. considering the 5G context, the sub-carrier spacing may vary from 15 kHz to 240 kHz, e.g. may be 15 kHz (e.g., considering 1 slot per sub-frame), 30 kHz (e.g., considering 2 slots per sub-frame), 60 kHz (e.g., considering 4 slots per sub-frame), 120 kHz (e.g., considering 8 slots per sub-frame), or 240 kHz (e.g., considering 16 slots per sub-frame).

For resource allocation purposes, the communication symbols within a time slot may be grouped together in the frequency domain. A sub-frame 192 may include, within a slot in the time domain, one or more resource blocks 194 in the frequency domain (e.g., sixteen resource blocks 194 in the exemplary configuration in FIG. 1D). Illustratively, time-frequency resources in a radio access network may be partitioned into resource blocks 194. A resource block 194 may be understood as a resource allocation portion (also referred to herein as resource allocation unit or resource allocation block), and may have a predefined width in frequency and a predefined length in time. The width and the length of a resource block may be dependent on the sub-carrier spacing (in frequency) supported by the radio communication technology. A resource block 194 may include a predefined number of contiguous sub-carriers in the frequency domain. As a numerical example, a resource block 194 may include 12 contiguous sub-carriers in the frequency domain. The number of resource blocks 194 in a sub-frame 192 may be selected depending on the bandwidth capabilities of the wireless network (e.g., in downlink/uplink), and may be in a range from 1 to 275, as a numerical example. A resource block 194 may be a physical resource block or a virtual resource block, as examples.

A resource block 194 may have a length of one time slot, and a width dependent on the sub-carrier spacing. As numerical examples, a resource block may be 180 kHz wide in frequency and 1 ms long in time (e.g., considering 1 slot per sub-frame), or 360 kHz wide in frequency and 0.5 ms long in time (e.g., considering 2 slot per sub-frame), or 720 kHz wide in frequency and 0.25 ms long in time (e.g., considering 4 slot per sub-frame), or 1440 kHz wide in frequency and 0.125 ms long in time (e.g., considering 8 slot per sub-frame), or 2880 kHz wide in frequency and 0.0625 ms long in time (e.g., considering 16 slot per sub-frame).

A resource block 194 may include a plurality of resource elements. A resource element may be or may include one sub-carrier of one communication symbol (e.g., a 15 kHz sub-carrier by one OFDM symbol, as an example). A resource element may be a single time-frequency resource included in a resource block 194.

The resource blocks 194 of a sub-frame 192 may be grouped into one or more sub-bands 196. Illustratively, a sub-frame 192 may include one or more sub-bands 196 (e.g., four sub-bands 196 in the exemplary configuration in FIG. 1D), and a sub-band 196 may include (e.g., may cover) one or more contiguous resource blocks 194, e.g. a plurality of resource blocks 194 (e.g., four resource blocks 194 in the exemplary configuration in FIG. 1D). A sub-band 196 may cover a predefined frequency range within the sub-frame. The frequency range of a sub-band 196 may be dependent on the number of resource blocks 194 in the sub-band and on the width of each resource block 194. As a numerical example, a sub-band may have a (frequency) width in the range from 180 kHz to 23.04 MHz, for example from 720 kHz to 11.52 MHz. Different sub-bands 196 within a same sub-frame may have a same width or a different width. As another numerical example, a sub-band 196 may include a number of resource blocks 194 in the range from 1 to 8, for example in the range from 2 to 4.

As alternative or additional resource allocation portion, the resource blocks 194 of a sub-frame 192 may be grouped into one or more resource block groups 198 (RBG).

Illustratively, a sub-frame 192 may include one or more resource block groups 198 (e.g., two resource block groups 198 in the exemplary configuration in FIG. 1D), and a resource block group 198 may include one or more (contiguous) resource blocks 194 (e.g., may cover one or more contiguous sub-bands 196), e.g. a plurality of resource blocks 194 (e.g., eight resource blocks 194 in the exemplary configuration in FIG. 1D). The number of resource blocks 194 in each resource block group 198 may vary depending on the system bandwidth. As a numerical example, a resource block group 198 may include a number of resource blocks 194 in the range from 2 to 8, for example in the range from 3 to 6. Different resource block groups 198 within a same sub-frame may include a same number of resource blocks 194 or a different number of resource blocks 194. In this context, a sub-band 196 may cover a plurality of contiguous resource blocks 194, which may be a sub-set of the resource blocks 194 included in a resource block group 198. A resource block group 198 may include (e.g., cover) a set of adjacent sub-bands 196 which have common allocation.

Various resource allocation alternatives may exist, e.g. at resource block level, sub-band level, or resource block group level, as examples. Illustratively, network resources may be allocated to the users in resource allocation portions, e.g. as (individual) resource blocks 194, or as sub-bands 196, or as resource block groups 198. A resource allocation portion may be or may include a set of information that may be schedulable as a unit (e.g., that a network access node may schedule as a unit). Illustratively, a resource allocation portion may be representative of time and frequency allocation for data transmission/reception to and/or from a user (e.g., may be representative of how much bandwidth is allocated to a user, and for how long). In the context of the present disclosure, a resource block group may be a first resource allocation portion, a sub-band may be a second resource allocation portion (less wide in frequency than a resource block group), and a resource block may be a third resource allocation portion (less wide in frequency than a resource block group and a sub-band).

In the context of wireless communications, constant efforts are devoted to improving the transmission capabilities of a wireless system, with the aim of increasing the throughput and serve as many users as possible, while ensuring a fair distribution of network resources among the users. Various technologies have been developed to increase the amount of data that may be transmitted/received in a wireless network. As an example, a network access node may be configured for multiple-input multiple-output (MIMO), which includes transmitting and receiving of more than one data signal simultaneously over a same radio channel (illustratively, to and from a same wireless communication device). In a MIMO configuration, a network access node communicates with a single wireless communication device at a time, so that MIMO may also be referred to as single-user MIMO (SU-MIMO). As another example, in a more advanced implementation (e.g., in a 5G wireless network), a network access node may be configured to perform multi-user multiple-input multiple-output (MU-MIMO), also referred to as massive MIMO (MaMIMO), in which the network access node may communicate with multiple wireless communication devices simultaneously. MU-MIMO may thus support multiple users attempting to communicate with the wireless network at the same time.

A network access node (e.g., the network access node 104) configured for massive MIMO may include a plurality of antennas to enable beamforming to communicate in parallel with a plurality of wireless communication devices, thus increasing the wireless throughput. MU-MIMO may include downlink MU-MIMO (DL MU-MIMO) in which a network access node sends data to multiple wireless communication devices simultaneously, and uplink MU-MIMO (UL MU-MIMO) in which a network access node receives data from multiple wireless communication devices simultaneously. However, in scenarios with users closely-spaced with one another, inter-user interference may deteriorate the quality of the signal(s) received by or transmitted from the wireless communication devices.

User scheduling plays in general an important role in the framework of wireless communications, but is particularly relevant in the context of MU-MIMO applications. Illustratively, user scheduling may provide allocating network resources to the users in a way that ensures a fair resource distribution while reducing inter-user interference, thus improving the signal-to-noise ratio, reducing error rate, etc. However, finding a suitable scheduled user set is a nontrivial task, which may include extensive computations or which may rely on sub-optimal approaches that are less demanding in terms of computational effort but provide sub-optimal performance.

The present disclosure may be based on the realization that a GNN-approach may enable a scalable solution to user scheduling, which may combine a reduced computational effort with an improved performance compared to conventional approaches. The GNN-based user scheduling described herein may be implemented, for example, in a massive MIMO wireless infrastructure, as discussed in further detail below. In FIG. 2A to FIG. 2D the concept of user scheduling and exemplary conventional approaches to user scheduling will be described in further detail.

Figure 2A:
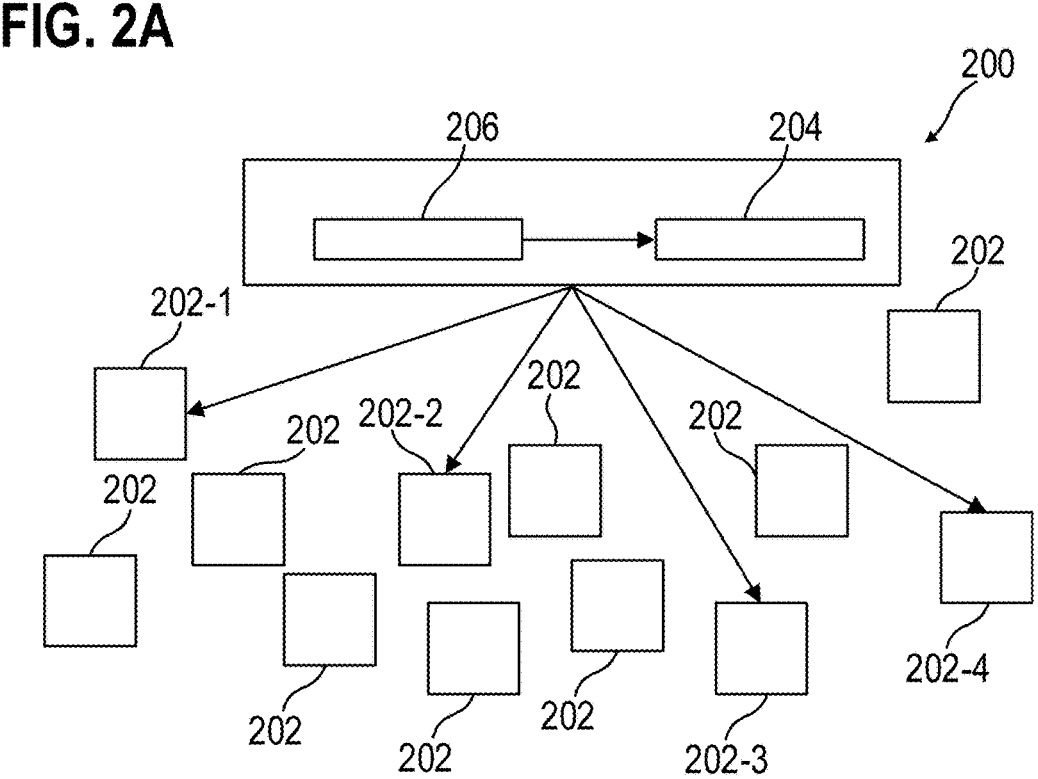
FIG. 2A and FIG. 2B show user scheduling in a wireless network in a schematic representation, according to the present disclosure.
Figure 2B:
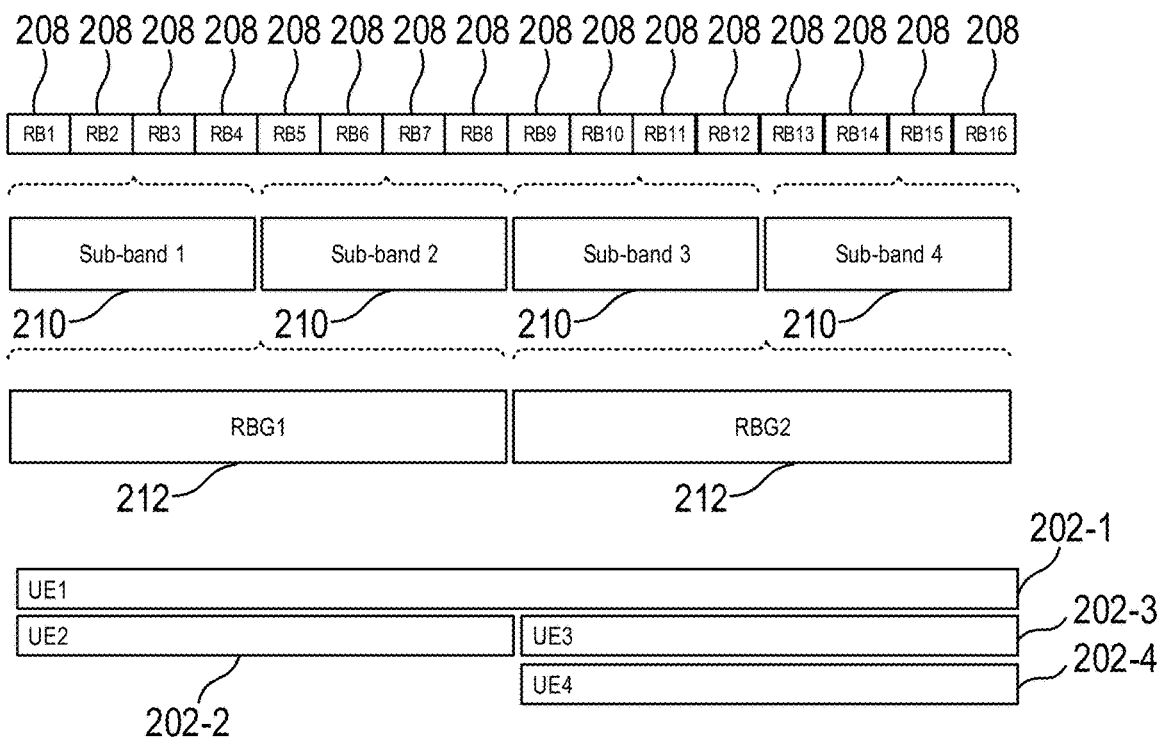

FIG. 2A and FIG. 2B show user scheduling in a wireless network in a schematic representation, according to the present disclosure. In FIG. 2A and FIG. 2B (and further in FIG. 2C and FIG. 2D), user scheduling is described from the standpoint of a network access node 200. In 4th Generation (4G) and 5th Generation (5G) systems a network access node 200 (e.g., a base station, eNB for 4G, gNB for 5G and beyond) may be responsible for resource scheduling for both the uplink and downlink channels. It is however understood that also other entities of a wireless network may be responsible for user scheduling, and the aspects described in relation to user scheduling at a network access node 200 may apply in a corresponding manner to user scheduling at other entities in a wireless network. The network access node 200 may be configured as the network access node 104 described in relation to FIG. 1A to FIG. 1D.

The network access node 200 may be configured to perform user scheduling of a plurality of wireless communication devices 202 in the wireless network, e.g. a plurality of wireless communication devices 202 that the network access node 200 serves. The wireless communication devices 202 (e.g., user equipment) may be configured as the wireless communication device 102 described in relation to FIG. 1A to FIG. 1D, and may be communicatively connected with the network access node 200.

As an exemplary configuration, the network access node 200 may include a Medium Access Control (MAC) scheduler 204 configured to perform allocation of network resources to the wireless communication devices 202 attempting to connect with the wireless network. The MAC scheduler 204 may be configured to receive allocation information 206 (e.g., SU-MIMO channel state information), based on which the MAC scheduler 204 may decide how to allocate the network resources (e.g., bandwidth, latency, etc.) among the wireless communication devices 202.

The allocation information 206 may include, for example, quality of service (QoS) data, channel state information, buffer status from the upper layers, etc. The MAC scheduler 204 may be configured to receive allocation information 206 from the wireless communication devices 202 (e.g., regarding the respective channel quality, e.g. in terms of strength of the signal, noise, etc.) and/or from other entities (nodes) in the wireless network, such as from the policy and charging rules function (PCRF).

The channel state information (CSI) may include information on channel properties of the communication link between a network access node (e.g., the network access node 200) and a wireless communication device (e.g., one of the wireless communication devices 202), as known in the art. The channel state information may be information about a user equipment that is available at a base station. The channel state information may include, for example, SU-MIMO precoding matrix indicator (PMI) (e.g., per sub-band), SU-MIMO beamformer (e.g., obtained at a network access node using sounding signal), channel quality indicator (CQI) per layer (e.g., per sub-band), and/or rank indicator (RI). The channel quality indicator may represent the layer effective signal-to-interference-and-noise ratio measured over reference signals (RS) with full power. The rank indicator may represent the number of MIMO layers of a user.

FIG. 2B shows an exemplary allocation of resource allocation portions to some of the wireless communication devices 202, e.g. a first wireless communication device 202-1 (e.g., a first user equipment UE1), a second wireless communication device 202-2 (e.g., a second user equipment UE1), a third wireless communication device 202-3 (e.g., a third user equipment UE3), and a fourth wireless communication device 202-4 (e.g., a fourth user equipment UE4). Illustratively, the MAC scheduler 204 may be configured to allocate one or more resource blocks 208, or one or more sub-bands 210, or one or more resource block groups 212 to a user, based on the allocation information 206.

In the exemplary configuration in FIG. 2B, the MAC scheduler 204 may allocate resources to the first wireless communication device 202-1 at the same time as the second wireless communication device 202-2, and then stop allocating resources to the second wireless communication device 202-2 to allocate resources to the third and fourth wireless communication devices 202-3, 202-4.

The MAC scheduler 204 may be configured to perform user scheduling according to one or more scheduling algorithms. As an example, the MAC scheduler 204 may be configured to perform user scheduling according to a naive algorithm (also referred to as exhaustive search, see FIG. 2C), or according to a greedy algorithm (see FIG. 2D), which may be used to select the users to be grouped for transmissions. The algorithms may be run at the network access node 200 based on certain knowledge of the wireless communication devices that it serves.

Figure 2C:
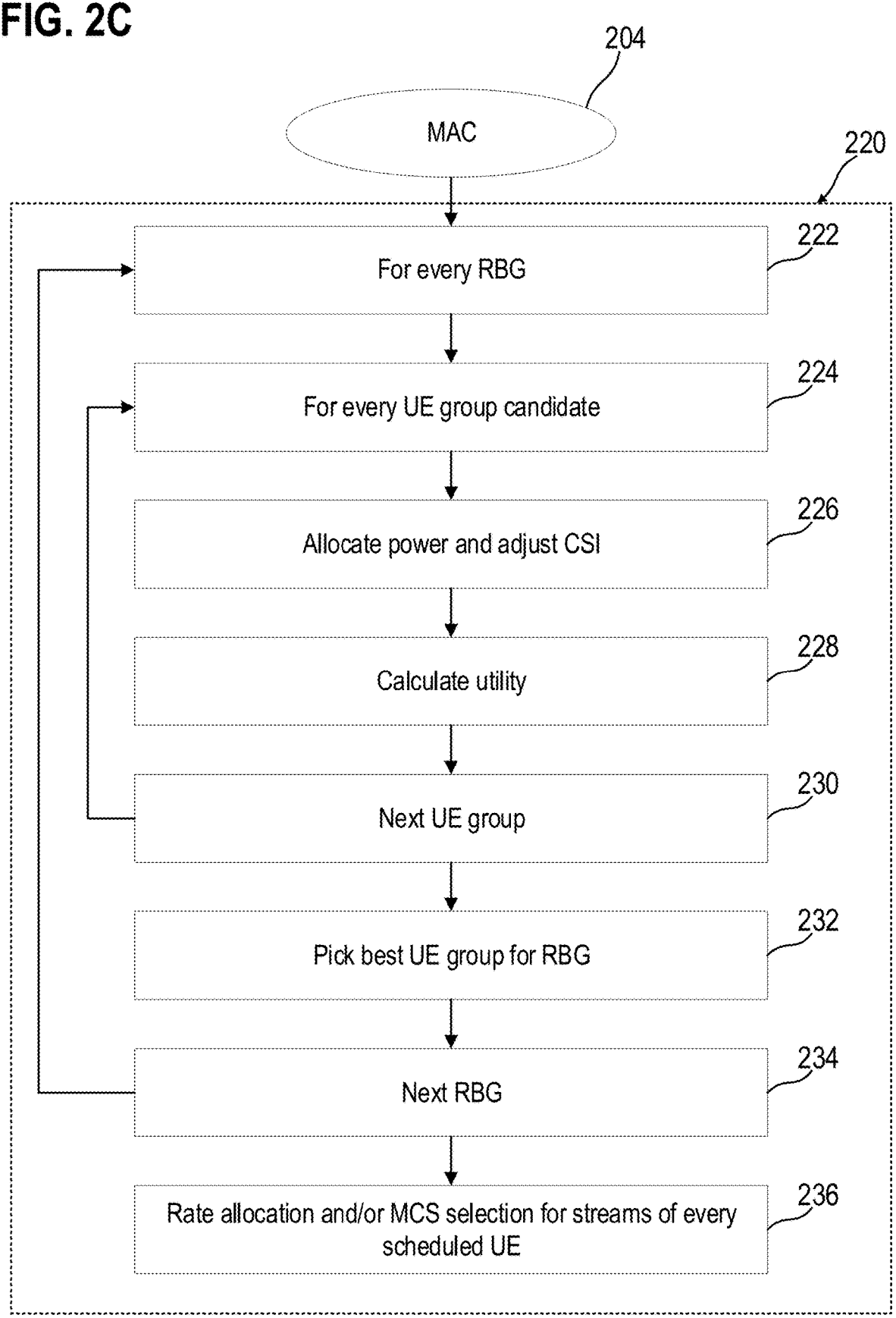
FIG. 2C shows a flow diagram of a naive algorithm for user scheduling in a wireless network according to the present disclosure.

FIG. 2C shows a flow diagram of a naive algorithm 220 for user scheduling in a wireless network according to the present disclosure. The naive user grouping algorithm 220 may be configured as follows: for every resource block group (222) and for every group candidate among the possible groupings of wireless communication devices (224), e.g. every UE group candidate, the naive algorithm 220 may include allocating power and adjusting the channel state information (226). The naive algorithm 220 may further include calculating the utility (228) (e.g., the throughput) and then moving to the next group candidate (230), e.g. move back to 224. Subsequently, the naive algorithm 220 may include selecting (232) the best group for the resource block group (e.g., the group with the greatest utility associated therewith), and then moving to the next resource block group (234), e.g. move back to 222. Finally, the naive algorithm 220 may include rating (236) the allocation or modulation and coding scheme selection (MCS selection) for streams of every scheduled wireless communication device (e.g., every scheduled UE). Illustratively, the naive algorithm may iterate over all the possible groupings of the user equipment for each resource block group to be scheduled, to find the grouping providing the greatest utility for that resource block group before moving to the next resource block group.

From the flow diagram in FIG. 2C it may be seen that the MAC scheduler 204 runs two nested loops. The outer loop is per resource block group 212. The inner loop goes over every possible allowed user grouping, calculates the utility for that user grouping and then the best user grouping (e.g., the user grouping providing the greatest throughput) is selected to be scheduled for that resource block group 212. The number of groups to consider in the inner loop is $C_1^N + C_2^N + \ldots + C_m^N$ where N is the total number of active users in the user pool and m is the maximum number of users that can be co-scheduled within the same resource block group. The number of groups to consider may thus be significantly high. A greedy algorithm, as exemplarily illustrated in FIG. 2D, may lower the number of candidate groups that are considered.

Figure 2D:
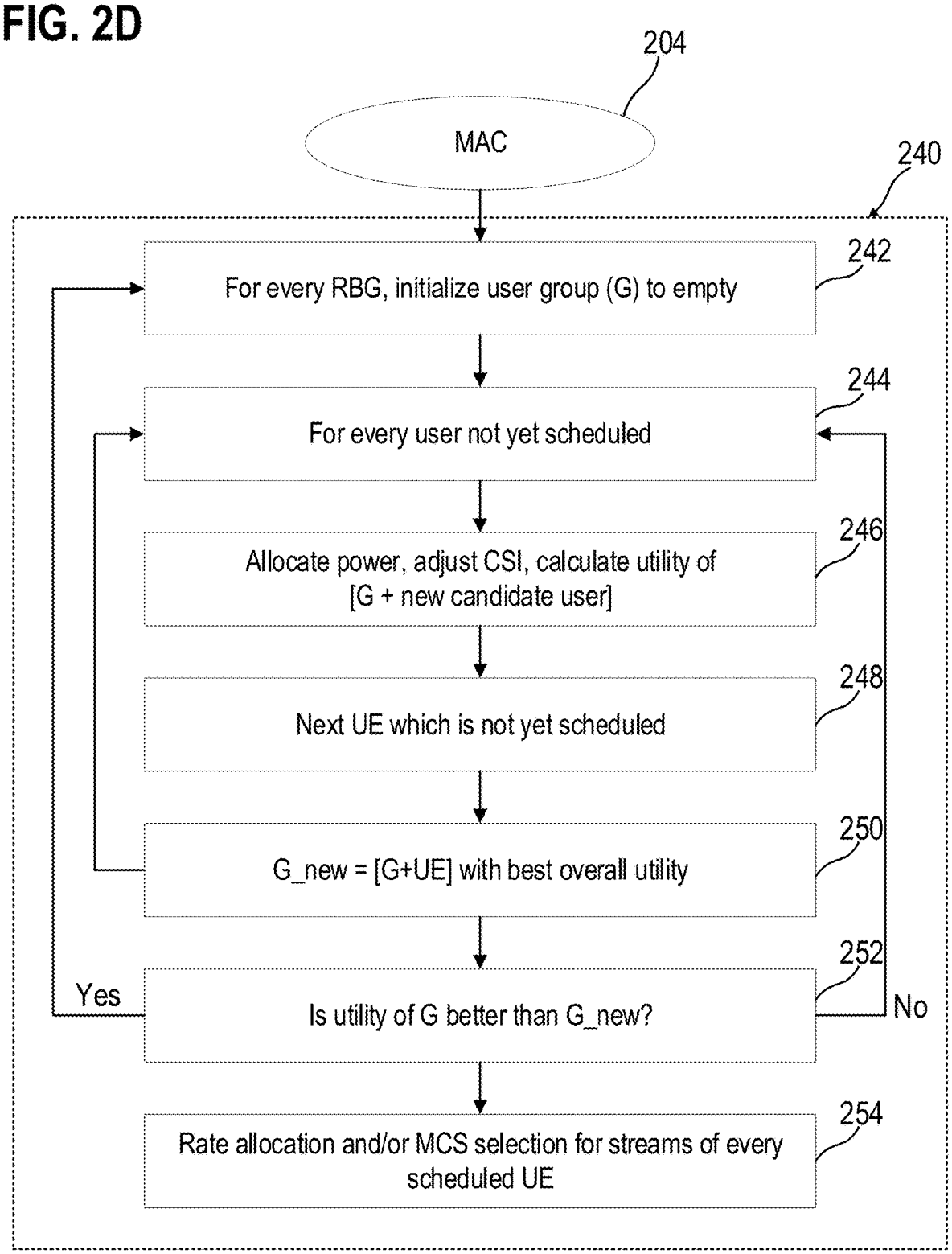
FIG. 2D shows a flow diagram of a greedy algorithm for user scheduling in a wireless network according to the present disclosure.

FIG. 2D shows a flow diagram of a greedy algorithm 240 for user scheduling in a wireless network according to the present disclosure. The greedy user grouping algorithm 240 may be configured as follows: the greedy algorithm 240 may include, for every resource block group, initializing (242) a user group (G) to empty, then, for every user not yet scheduled (244), allocating power, adjusting channel state information, and calculating the utility of the user group (G) to which the new candidate user is added (246). The greedy algorithm 240 may further include moving to the next wireless communication device (the next user) which is not yet scheduled (248). The greedy algorithm 240 may further include defining as new user group (G_new) the (previous) user group (G) to which the user with the best overall utility is added (250), illustratively G_new=G+UE. The greedy algorithm 240 may further include determining whether the utility of the (old) user group is better than the utility of the new user group (252). If yes (yes in 252), the greedy algorithm 240 may include selecting the old user group and moving to the next resource block group (move back to 242). If no (no in 252), the greedy algorithm 240 may include defining the new user group as user group and move back to 244, illustratively to add another user to the group. Finally, the greedy algorithm 240 may include rating (254) the allocation or modulation and coding scheme selection (MCS selection) for streams of every scheduled wireless communication device (e.g., every scheduled UE). The greedy algorithm 240 may provide significantly decreasing the number of user groups to be considered (with respect to the naive algorithm) to $N+(N-1)+\ldots+(N-m+1)$ instead of $C_1^N+C_2^N+\ldots+C_m^N$. The greedy algorithm provides thus a less resource-intensive but also less accurate selection, in which not all the possible groupings are considered.

The present disclosure may be based on the realization that conventional user scheduling approaches (e.g., the naive algorithm illustrated in FIG. 2C, or the greedy algorithm illustrated in FIG. 2D, or other conventional approaches) have several drawbacks that may limit the development of wireless communication deployments, e.g. drawbacks in terms of complexity and/or performance. Illustratively, conventional approaches may include computationally-complex iterations over a high number of possible solutions, or may accept a tradeoff between complexity and performance thus providing a sub-optimal scheduling.

The present disclosure may thus be related to applying domain knowledge to define an approach for user scheduling that enables a more time- and resource-efficient operation, without leading to a decrease in the performance of the wireless network (e.g., without leading to a sub-optimal throughput). The present disclosure may be related to the use of a graph neural network for user scheduling, which may enable a low complexity one-shot (single inference) user scheduling, which may thus decrease the complexity beyond conventional approaches such as the naive approach and the greedy approach, while still ensuring a high quality performance of the wireless network. Illustratively the GNN-approach may reduce or eliminate the resource-intensive iterations over potential group candidates. As an exemplary scenario, the machine learning/artificial intelligence (ML/AI) solution discussed herein may be for use in a massive MIMO network access node (e.g., a massive MIMO base station), e.g. to reduce complexity of user scheduling in MAC layer.

Figure 3A:
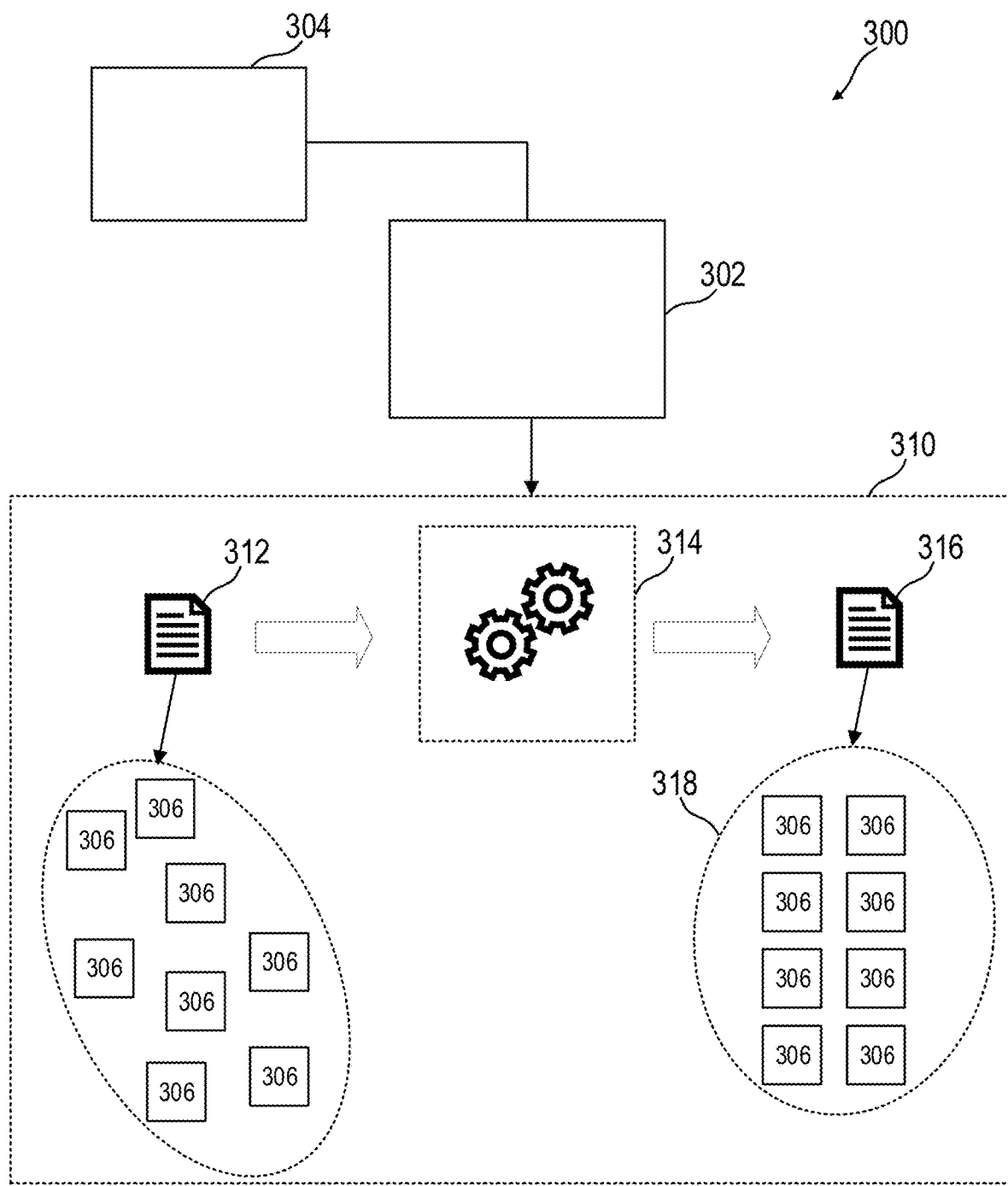
FIG. 3A shows a schematic representation of a device for performing user scheduling in a wireless network by using a graph neural network, according to the present disclosure.

FIG. 3A shows a device 300 for use in a wireless network (e.g., in the wireless network 100, for example in a 5G wireless network) in a schematic representation according to the present disclosure. The device 300 may be configured to perform GNN-based user scheduling in the wireless network. The device 300 may be configured to be deployed at various locations within the wireless network. As an example, a network access node (e.g., the network access node 104, 200 described in relation to FIG. 1A to FIG. 2A, e.g. a network access node configured to perform MU-MIMO) may include the device 300. For example, a base station (e.g., eNodeB, gNodeB) may include the device 300. It is however understood that also other entities within a wireless network may include a device configured to perform GNN-based user scheduling as described herein, e.g. a core network node (e.g., a network controller) may include the device 300, as another example. An entity including the device 300 may be understood as the entity being configured such that the operation of the device 300 runs at that entity (e.g., in a host, in a processor, or in a plurality of processors, at that entity). It is also understood that the operation of the device 300 (e.g., of a processor 302 of the device 300) may be distributed among more than one network entity, e.g. among a plurality of entities (e.g., nodes and/or units) present in the wireless network and/or communicatively coupled with the wireless network (e.g., in a cloud-environment). As an exemplary configuration, the device 300 may be a module or a node for deployment in a wireless network. It is understood that the representation of the device 300 may be simplified for the purpose of illustration, and the device 300 may include additional components with respect to those shown.

The device 300 may include a processor 302 configured to perform user scheduling by using the output of a trained graph neural network model 314. The processor 302 may be configured to carry out a GNN-based user scheduling method 310 to provide a scheduled user set for allocation of network resources of the wireless network. The GNN-based user scheduling described herein may apply to downlink and/or uplink user scheduling, as examples.

To perform user scheduling, the processor 302 may be configured to provide input data 312 to a trained graph neural network model 314. The input data 312 may be indicative of a graph representation of a plurality of wireless communication devices 306. Illustratively, the input data 312 may be representative of a network scenario associated with a plurality of wireless communication devices 306. The wireless communication devices 306 may be communicating with the wireless network or may be attempting to communicate with the wireless network (illustratively, the wireless communication devices 306 may be connected or attempting to connect with the wireless network for data transmission/reception). The input data may thus describe information associated with a plurality of wireless communication devices 306 that wish to communicate with the wireless network at the same time, e.g. a plurality of wireless communication devices 306 that are in competition with one another for resource allocation at the wireless network. As an exemplary scenario, the wireless communication devices 306 may be served by a (same) network access node of the wireless network (e.g., a network access node including the device 300), and may wish to communicate in downlink or uplink with the network access node (at the same time). The wireless communication devices 306 may be competing for a fixed amount of resources, in both time and frequency, made available from the wireless network, e.g. from the network access node. The wireless communication devices 306 may be configured as the wireless communication device 102 described in relation to FIG. 1A to FIG. 1D (e.g., the plurality of wireless communication devices 306 may be or may include a plurality of user equipment). It is understood that the number of wireless communication devices 306 illustrated in FIG. 3A is exemplary and is scalable to any amount.

A "graph representation" of the plurality of wireless communication devices 306 may be understood as a representation of the wireless communication devices 306 suitable for processing by a graph neural network (e.g., by the trained graph neural network model 314). A "graph representation" may thus be or include any suitable structure to represent data for processing by a graph neural network. For example, as discussed in further detail below, a "graph representation" may include vectors and matrices representing the graph, e.g., representing nodes and edges of the graph (illustratively, representing the wireless communication devices 306 and the interactions among the wireless communication devices 306).

The trained graph neural network model 314 may be configured to provide output data 316 representative of a scheduled user set 318 which includes the plurality of wireless communication devices 306. Illustratively, the trained graph neural network model 314 may be configured to provide output data 316 that define a scheduled user set 318 for the network scenario that the input data 312 represent (e.g., a best overall scheduled user set 318, as discussed below, for example the scheduled user set 318 providing the greatest throughput and/or lowest interference for the network scenario that the input data 312 represent). As an exemplary configuration, the output data 316 may include a set of scores representative of the scheduled user set 318 including the plurality of wireless communication devices 306. The set of scores may include a plurality of scores, e.g. one score per each wireless communication device of the plurality of wireless communication devices 306 (e.g., one score per each wireless communication device 306 per each sub-band of the wireless network). The score(s) associated with a wireless communication device 306 may be representative of a scheduling order for that wireless communication device (e.g., in a sub-band), e.g. of a priority associated with that wireless communication device for allocation of network resources. A possible configuration of the trained graph neural network model 314 will be described in further detail in relation to FIG. 3B to FIG. 3D.

The output data 316 may thus be indicative of an order in which network resources may be allocated to the wireless communication devices 306, e.g. may be indicative of an amount of bandwidth, a time duration, and a time sequence in which network resources may be allocated to the wireless communication devices 306. The scheduled user set 318 may thus represent an instruction indicating to which user, at what time, and for how long network resources are to be allocated. As an exemplary scenario, the scheduled user set 318 may include assigning a first bandwidth portion for a first time duration to a first user, assigning a second bandwidth portion for a second time duration to a second user (e.g., in parallel with the first user, or after allocation to the first user), assigning a third bandwidth portion for a third time duration to a third user (e.g., in parallel with the first and/or second user, or after allocation to the first and/or second user), etc., according to the order (and priority) indicated by the scheduled user set 318

The processor 302 may be further configured to instruct user scheduling of the plurality of wireless communication devices 306 based on the output data 316 of the trained graph neural network model 314. The processor 302 may be configured to instruct user scheduling by using the output data 316, e.g. user scheduling according to the scheduled user set 318 that the output data 316 represent. As an example, the processor 302 may be configured to instruct scheduling of the plurality of wireless communication devices 306 according to a scheduling order defined by the plurality of scores that the output data 316 include (e.g., the wireless communication devices 306 may be ordered for descending associated score, as an example). The processor 302 may be configured to perform user scheduling by itself, e.g. may be configured to manage resource allocation to the wireless communication devices 306, or may be configured to transmit an instruction to a further entity configured to implement the resource allocation (e.g., to a resource allocation manager, e.g. to a MAC scheduler). Instructing user scheduling may include, for example, defining an amount of bandwidth and/or latency to be allocated to each wireless communication device of the plurality of wireless communication devices 306 based on the output data 316 of the trained graph neural network model 314. For example, instructing user scheduling may include deciding how the wireless communication devices 306 may use uplink and downlink channels based on the output data 316 of the trained graph neural network model 314, e.g. deciding which wireless communication devices 306 may be scheduled (together) for a sub-band or a resource block group of the wireless network and/or for which time duration (e.g., for how many resource blocks, how many sub-bands, and/or how many resource block groups). As an exemplary configuration, the processor 302 may be or may include a scheduler (illustratively, a scheduling manager), e.g. a MAC scheduler.

After instructing user scheduling for a resource block group, the processor 302 may be configured to repeat the user scheduling method 310 for another resource block group of the wireless network, e.g. to provide at the trained graph neural network model 314 new input data 312 describing a new (updated) network scenario associated with the other resource block group. The processor 302 may be configured to repeat the user scheduling method 310 for each resource block group of the wireless network. The processor 302 may be configured to (continuously) perform user scheduling to provide at each time a scheduled user set 318 that optimizes communication in the wireless network (e.g., a scheduled user set that maximizes throughput).

By way of illustration, the use of a trained graph neural network 314 may provide determining with a one-shot inference the scheduled user set 318 that provides the greatest throughput (e.g., with lowest interference among the devices) in the given network scenario, without iterating over all the possible scheduled user sets and without having to accept a tradeoff between complexity and performance. This may be related to the nature of a graph neural network, which allows inferring relationships among elements of a complex system in an efficient manner.

The device 300 may further include a memory 304 storing instructions and/or data for the operation of the processor 302. The memory 304 may be communicatively coupled with the processor 302 (e.g., via a wired or wireless connection). The memory 302 may be disposed at a same entity as the processor 302 (e.g., at a same network access node) or may be disposed at another entity (e.g., another network access node, or another node in the wireless network, or in a cloud-environment, as examples), e.g. in the context of a distributed system. The memory 304 may store instructions to perform the user scheduling method 310. For example, the memory 304 may store the trained graph neural network model 314. As another example, the memory 304 may store the input data provided to the trained graph neural network model 314 and/or the output data 316 from the trained graph neural network model 314.

As an exemplary configuration, considering the ORAN context, the trained graph neural network model 314 may be configured as a xAPP in or for a radio access network intelligent controller. Illustratively, the user scheduling method 310 may be provided (e.g., stored) as a xAPP in the radio access network intelligent controller. As another example, a distributed unit (e.g., a virtual distributed unit) of a radio access network may store the graph neural network model 314 (e.g., may store instructions describing the user scheduling method 310). The processor 302 may be configured to access the instructions (e.g., to access the trained graph neural network model 314) in the xAPP or in the distributed unit.

In the following, e.g. in relation to FIG. 3B to FIG. 3D, a configuration of a trained graph neural network model (e.g., the trained graph neural network model 314) will be provided, illustratively a possible configuration of network architecture and parameters (e.g., input data, output data, update rules, propagation, etc.). The configuration described herein has been found to provide an efficient representation of a network scenario for processing via a graph neural network. Illustratively, the configuration described herein has been engineered having in mind the context of a wireless network and of the interactions among wireless communication devices to comprehensively describe a scenario in which user scheduling may be performed. It is however understood that the approach described herein may include other configurations of a graph neural network, e.g. with a different representation of input data, a different network architecture, different type of output data, different update functions, etc.

Figure 3B:
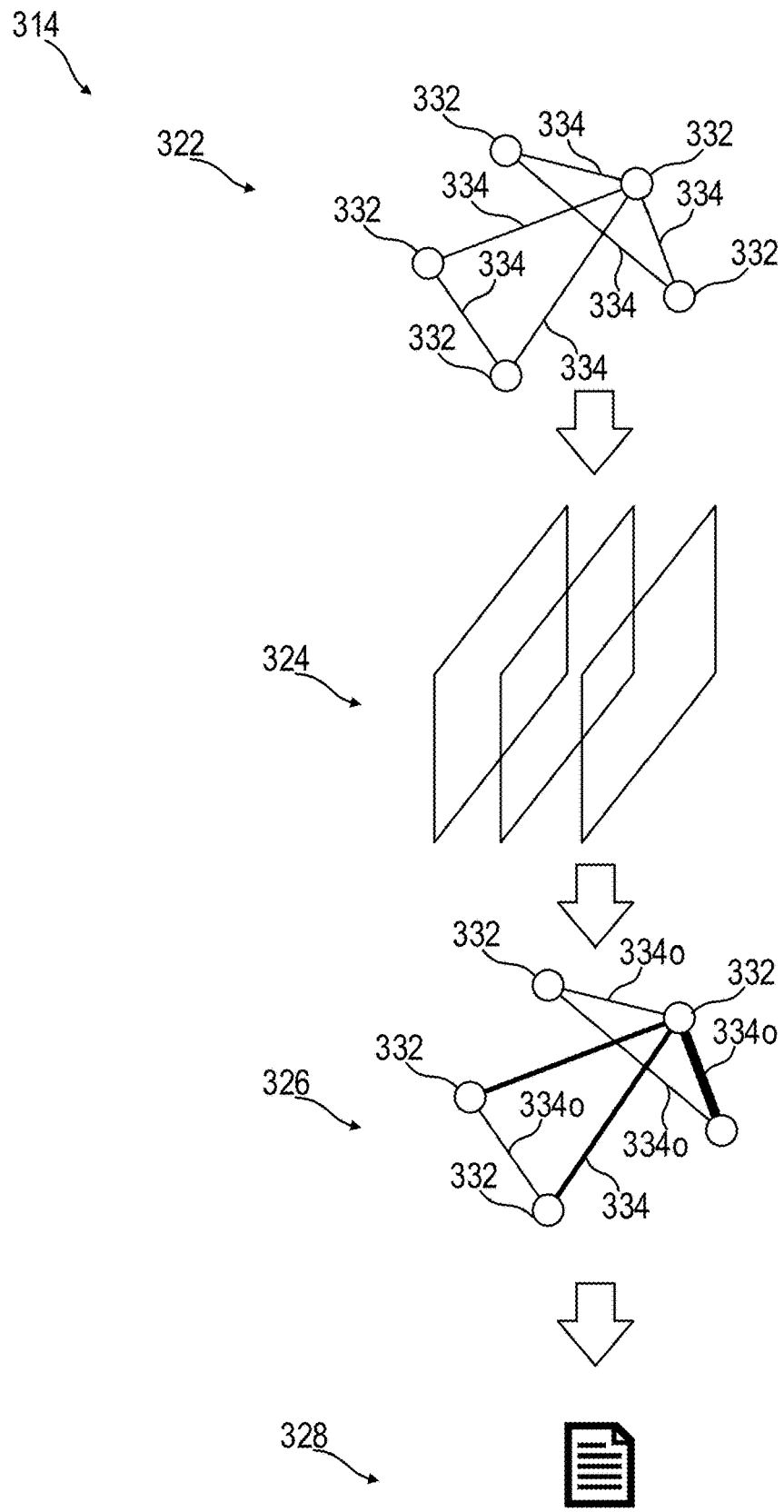
FIG. 3B shows a trained graph neural network model in a schematic representation, according to the present disclosure.

FIG. 3B shows an exemplary configuration of the trained graph neural network model 314 in a schematic representation, according to the present disclosure. In general, the overall concept of graph neural network may be known in the art, so that the following description focuses on aspects relevant to the present disclosure. An abridged overview of the operation of the trained graph neural network model 314 may be as follows: starting from a graph representation 322 of the network scenario (e.g., which the input data 312 represents) the trained graph neural network model 320 may provide a transformation of the attributes of the graph representation 322 (via propagation through a plurality of graph neural network layers 324) to determine an output graph representation 326 (e.g., which the output data 316 represents) from which a prediction 328 may be determined (e.g., the scheduled user set 318). It is understood that it may be possible to represent "data" in the context of a graph neural network in different ways, e.g. in the form of matrices, vectors, or other mathematical representations, or with other forms of representation. Thus, reference in the following to a particular type of representation (e.g., a matrix, or a vector) are exemplary and other types of representation may be provided.

The trained graph neural network model 314 may be or may include any suitable configuration of a graph neural network. As an example, the trained graph neural network model 314 may be or include a diffusion convolutional graph neural network. As other examples, the trained graph neural network model 314 may be or include a recurrent graph neural network, a spatial convolutional network, or a spectral convolutional network. The discussion in the following may be related to the case in which the trained graph neural network model 314 is configured as a diffusion convolutional graph neural network, which is a configuration that has been found effective to determine a scheduled user set. It is however understood that the discussion may correspondingly apply to other configurations of the trained graph neural network model.

A graph representation 322 provided as input to the trained graph neural network model 314 may include a plurality of nodes 332 (also referred to as vertices), and a plurality of edges 334 (also referred to as links). The plurality of nodes 332 may be associated with the plurality of wireless communication devices 306, and the plurality of edges 334 may be associated with interactions among the plurality of wireless communication devices 306 (and/or with an interaction between a, e.g. each, wireless communication device 306 and the wireless network). Illustratively, an edge 334 may be associated with an interaction among the wireless communication devices associated with the nodes 332 that the edge 334 connects. The representation of nodes 332 and edges 334 in FIG. 3B is only for illustration purposes. Possible arrangements of nodes 332 and edges 334 will be described in further detail in relation to FIG. 3C and FIG. 3D. As an exemplary representation, the nodes 332 may be represented by respective (input) feature vectors and the edges 334 may be represented by an adjacency matrix. The edges 334 may be undirected, as the interactions among wireless communication devices 306 may occur from one wireless communication device to another wireless communication device and vice versa. However the edges 334 may also be directed, as another example.

The graph representation 322 may be configured according to the bandwidth of the wireless network, e.g. according to the partitioning of resources of the wireless network. Illustratively, the graph representation 322 may be configured according to a resource allocation portion schedulable in the wireless network. As an example, the graph representation 322 may include a plurality of graph representations (each with respective nodes 332 and edges 334) based on a plurality of resource allocation portions of a frame (or sub-frame) of the wireless network.

As an exemplary configuration, which may provide an efficient representation for user scheduling, the graph representation 322 may include a respective graph representation for each sub-band of the wireless network (e.g., for each sub-band of a sub-frame), e.g. for each sub-band of a resource block group of one or more resource block groups of the wireless network. A sub-frame, sub-band, resource block group, etc., "of a wireless network" may be understood as sub-frame, sub-band, resource block group associated with wireless communication in the wireless network (as discussed in relation to FIG. 1D). A graph representation associated with a sub-band may also be referred to herein as sub-band graph representation. A graph representation associated with a sub-band may be understood as a graph representation associated with a subset of resource blocks of the wireless network, e.g. a subset of resource blocks of a frame (or sub-frame), e.g. a subset of resource blocks of a resource block group. A graph representation associated with a sub-band may be a graph representation associated with a portion of the bandwidth covered by wireless communication in the wireless network. For example, each sub-band graph representation may include a same number of nodes 332 and a same number of edges 334, e.g. assuming that the wireless communication devices 306 may communicate over the different frequency ranges. In the following, the discussion of features of the graph representation 322 (and of the output graph representation 326) may apply in a corresponding manner to each sub-band graph representation (e.g., as input and/or output).

The number of nodes 332 of the graph representation 322 may be selected based on the number of wireless communication devices 306 to be scheduled and based on one or more properties of the wireless communication devices 306. For example, the plurality of nodes 332 may include, for each wireless communication device of the plurality of wireless communication devices 306, a number of nodes 332 corresponding to a number of layers (e.g., MIMO layers) associated with the wireless communication device 306. A "layer" associated with a wireless communication device may be a "data stream" to or from that wireless communication device 306, e.g. in a sub-band. In the context of (MU-)MIMO communication, each wireless communication device may have at least two layers associated therewith. A "layer" may also be referred to herein as "communication layer" or "signal layer", e.g. to distinguish it from a "graph neural network layer". For example, the processor 302 may be configured to provide the input data 312 based on a knowledge of the layers of the wireless communication devices 306, e.g. to define the number of nodes 332 of the graph representation(s) 322. Considering the plurality of sub-band graph representations, each sub-band graph representation may include a number of nodes for each wireless communication device corresponding to a number of layers associated with the wireless communication device in that sub-band (illustratively, in that frequency range).

Illustratively, the number of nodes 332 associated with a wireless communication device (e.g., for a sub-band) may be dependent on a rank of the wireless communication device 306. The rank of a wireless communication device may represent the number of useful layers that may be supported at the wireless communication device under the current channel conditions and modulation scheme. The rank of a wireless communication device may be dependent on the number of antennas (e.g., transmit and receive antennas) of the wireless communication device. As a numerical example, a rank of a wireless communication device may be an integer number in a range from one to four, e.g. with a greater rank representing a greater communication performance (e.g., less interference).

As mentioned above, each node of the plurality of nodes 332 has an input feature vector associated therewith, which may be indicative of one or more features of that node 332 (illustratively of the wireless communication device associated with that node 332). An input feature vector may be a node embedding of a node 332. Illustratively, the input feature vector may be representative of how the wireless communication device associated with that node 332 fits in the network scenario that the input data 312 describe.

The one or more features that an input feature vector of a node 332 describes may include one or more features associated with the communication capabilities of the wireless communication device 306 and/or with the communication channel to and from the wireless communication device 306 associated with that node 332. As an example, the one or more features of the wireless communication device 306 that the input feature vector describes may include one or more of: layer signal-to-interference-and-noise ratio (e.g., a MIMO layer SINR), a user weight, a precoding vector, and/or combinations thereof. Such features have been found to provide a suitable description of the communication context of a wireless communication device 306 for user scheduling. It is however understood that the input feature vector may be representative of additional, less, or alternative features for user scheduling purposes. A precoding vector may be indicated as $v_{u,p}$, to represent precoding vector of user u and its layer p. A precoding vector of a wireless communication device 306 may be or represent a beamforming configuration (e.g., for downlink or uplink) associated with that wireless communication device 306.

As mentioned above, a number of nodes 332 associated with a wireless communication device 306 may be dependent on the number of layers of that wireless communication device 306 (e.g., in a sub-band). Considering a wireless communication device 306, the plurality of nodes 332 may include a node for each layer of that wireless communication device 306 (a number of nodes 332 corresponding to the rank of the wireless communication device 306). Thus, an input feature vector may be provided (e.g., defined) for each layer of that wireless communication device 306 (and, in general, for each layer of each wireless communication device 306).

Considering the plurality of sub-band graph representations, the input feature vectors associated with the nodes may be defined per each sub-band. The input feature vectors may be representative of the one or more features of a node 332 (e.g., of the associated wireless communication device 306) in a respective sub-band. Illustratively, for each sub-band of a resource block group and for each layer associated with a wireless communication device in the sub-band, the input data 312 may include an input feature vector describing one or more features of the wireless communication device.

This representation may be described as follows. Considering $\mathcal{U}$ as the set of wireless communication devices 306 for which user scheduling is to be performed (illustratively, the set of active users), S as the plurality of sub-bands (the set of sub-bands) available for scheduling, and $P_u$ as the layers per wireless communication device (the set of layers per user), the input feature vector for a given sub-band, per wireless communication device and per layer, may be described as, $f_{s,u,p} \in R^{F_{in} \times 1}$, $s \in S$, $u \in \mathcal{U}$, $p \in P_u$, where $F_{in}$ is the dimension of input feature, $f_{s,u,p}$ is input feature vector for sub-band s, user u, layer p.

For processing through the trained graph neural network model 314, the input feature vectors of the nodes 332 may be combined together to provide a combined feature vector. Illustratively, the input data 312 may include a combined feature vector including the input feature vectors of the plurality of nodes 332 of the graph representation 322 (e.g., the combined feature vector may be a vector of vectors). Considering the sub-band graph representations, the input data 312 may include a combined feature vector for each sub-band. A combined feature vector of a sub-band may include the input feature vectors of the plurality of nodes 332 associated with the sub-band (illustratively, the plurality of nodes 332 of the sub-band graph representation for that sub-band).

The input data 312 may include or represent correlation data representative of a (device-to-device) correlation among the wireless communication devices 306 to be scheduled. The correlation data may be associated with a resource allocation portion schedulable in the wireless network. As an example, the input data 312 may include (respective) correlation data for each resource block group of one or more resource block groups of the wireless network (e.g., representative of device-to-device correlation in the frequency range covered by the resource block group). As a further example, for each resource block group of the one or more resource block groups, the input data 312 may include or represent (respective) correlation data describing a correlation among the wireless communication devices 306 for each sub-band of the resource block group. The correlation data (e.g., pairwise SINR, as discussed below) may be representative of device-device interactions relevant for user scheduling, illustratively knowing how communication at one wireless communication device may affect communication at another wireless communication device (and vice versa) may assist the determination of the scheduled user set.

As an exemplary representation, the correlation data may include (may be represented as) a correlation matrix describing the correlation among the plurality of wireless communication devices 306. The correlation matrix may include a number of rows and columns corresponding to the number of wireless communication devices 306 (may be a D×D matrix, with D being the number of wireless communication devices for scheduling in the network scenario), and an element i,j of the correlation matrix may represent the correlation between wireless communication device i and wireless communication device j of the plurality of wireless communication devices 306. The correlation matrix may be denoted as $C_s$, s∈S and may be any matrix that captures the correlation between different layers of the users (e.g., pairwise SINR). The diagonal elements of the correlation matrix may be either 1 or 0 depending on what the correlation matrix represents.

The correlation data may describe how the communication of a wireless communication device 306 influences the communication of another wireless communication device 306, e.g. the correlation data may describe device-to-device interference among the wireless communication devices 306. As an example, the correlation data may include pairwise signal-to-interference-plus-noise ratios among the wireless communication devices 306, e.g. an element i,j of the correlation matrix may represent the signal-to-interference-plus-noise ratio between (a first) wireless communication device i and (a second) wireless communication device j of the plurality of wireless communication devices 306. As a further example, considering the sub-band graph representations, the correlation data may include pairwise signal-to-interference-plus-noise ratios among the wireless communication devices of the plurality of wireless communication devices 306 for each sub-band of a resource block group of the wireless network, illustratively may represent device-to-device interference in the various sub-bands of the wireless network.

The input graph representation 322 (e.g., for each sub-band), e.g. its edges 334 and nodes 332, may be based on the correlation data. Illustratively, the processor 302 may be configured to provide the graph representation 322 (and each sub-band graph representation) at least in part based on the correlation data describing the device-to-device correlations.

As an exemplary configuration, the processor 302 may be configured to provide the input data 312 (e.g., the input graph representations) based on information that the wireless communication devices 306 provide. Illustratively, the wireless communication devices 306 may transmit to the wireless network (e.g., to a network access node) information describing a communication scenario of the wireless communication device, e.g. a channel quality, a waiting time, etc. The processor 302 may be configured to determine the input data 312 based on the information describing the communication scenario.

Before exploring further the propagation of the graph representation(s) through the graph neural network, possible architectures of the graph representation(s) will be described in relation to FIG. 3C and FIG. 3D.

Figure 3C:
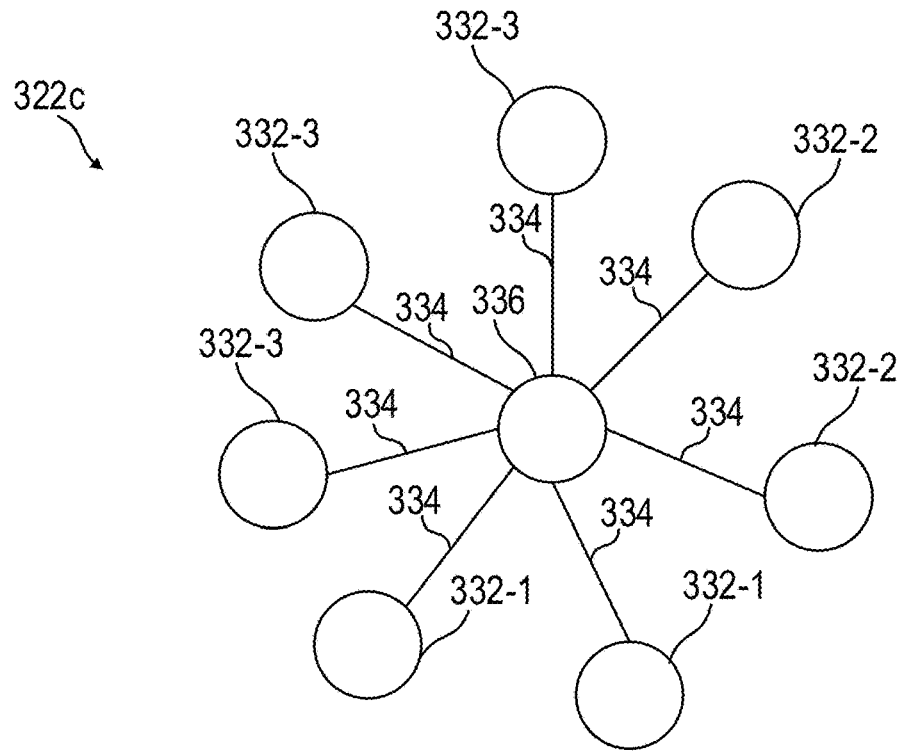
FIG. 3C and FIG. 3D show graph representations of wireless communication devices in a wireless network in a schematic representation, according to the present disclosure.
Figure 3D:
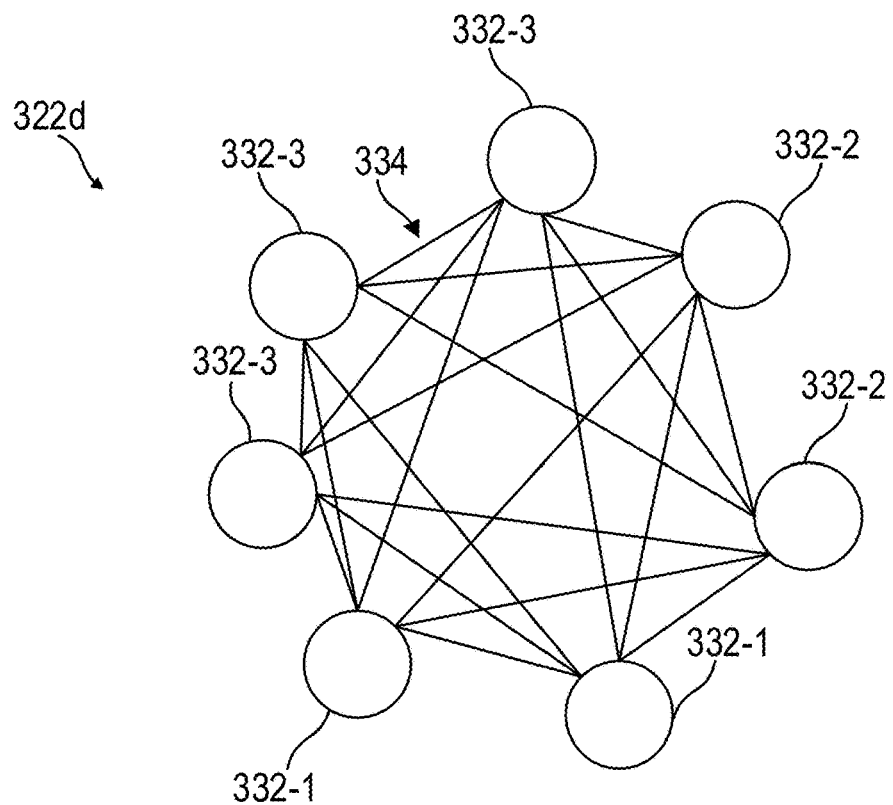

FIG. 3C and FIG. 3D show possible graph representations 322c, 322d of wireless communication devices in a wireless network a schematic representation, according to the present disclosure. Illustratively, FIG. 3C and FIG. 3D show possible graph representations 322c, 322d provided as input to the graph neural network model 314. The representations in FIG. 3C and FIG. 3D illustrate the exemplary scenario in which three wireless communication devices are considered, but it is understood that the representations in FIG. 3C and FIG. 3D may be scalable to any number of wireless communication devices for which user scheduling is to be performed. The graph representations 322c, 322d in FIG. 3C and FIG. 3D may provide a comprehensive characterization that enables evaluating the relevant interactions to determine a scheduled user set. It is however understood that other graph representations may be provided.

As a first exemplary graph representation 322c, as shown in FIG. 3C, the plurality of nodes 332 may (further) include a virtual node 336 not associated with any wireless communication device of the plurality of wireless communication devices 306. The virtual node 336 may be connected with any other node of the plurality of nodes 332. The other nodes of the plurality of nodes (associated with the wireless communication devices) may be connected only with the virtual node 336, and not with one another. The virtual node 336 may also be referred to as master node, or central node.

In the context of graph neural networks, in case a large number of nodes are present, as may be the case for nodes representing wireless communication devices in a wireless network, nodes that are far away from each other (illustratively, not directly connected, but perhaps connected through a plurality of other nodes) may not transfer information to one another in an efficient manner. Illustratively, the transfer of information between nodes that are far away from each other may occur over a large number of graph network layer updates (e.g., over a large number of message passing, as described below). Further illustratively, for a node, if the graph neural network has L layers, information may propagate L steps away (e.g., to other nodes that are L nodes away). In this context, the virtual node 336 may provide a path for information from each (other) node and to each (other) node, thus fully connecting the graph without directly connecting each node with each other node, which may be computationally challenging. The virtual node 336 may be connected to each node 332 and each edge 334 in the graph. Illustratively, the virtual node 336 may be a "network node", so that an edge 334 between the virtual node 336 and another node 332 may describe an interaction with the wireless network of the wireless communication device 306 associated with the node 332.

In the representation in FIG. 3C, the scenario may be as follows. The central node 336 may be the central virtual node. A first wireless communication device (UE1) and a second wireless communication device (UE2) may have rank 2, so that each may have two nodes associated therewith 332-1, 332-2. A third wireless communication device (UE3) may have rank 3, so that the third wireless communication device has three nodes 332-3 associated therewith.

As an additional or alternative configuration of a graph representation 322d, as shown in FIG. 3D, each node of the plurality of nodes 332 may be connected with each other node of the plurality of nodes 332. This representation may provide a more comprehensive characterization of the device-device interactions. It may be however more resource-demanding in terms of computations with respect to the representation with the virtual node 336 shown in FIG. 3C. In the representation in FIG. 3D, the scenario may be as follows. The first wireless communication device (UE1) and the second wireless communication device (UE2) may have rank 2, so that each may have two nodes associated therewith 332-1, 332-2. The third wireless communication device (UE3) may have rank 3, so that the third wireless communication device has three nodes 332-3 associated therewith. All the nodes of all wireless communication devices are connected with all other nodes (of same and other wireless communication devices). By way of illustration, the graph representation 322d in FIG. 3D may represent the correlation matrix between nodes. The virtual node is absent as a correlation between a virtual node and a wireless communication device may be undefined. Considering the sub-band graph representations, for each sub-band the correlation between nodes (e.g., a layer of a UE to the layer of another UE) may be calculated based on the CSI features, thus resulting in a fully connected graph between the nodes.

The graph representation 322 provided as input at the trained graph neural network model 314 may be configured according to the configuration with the virtual node 336 or without the virtual node 336 depending on the number of wireless communication devices 306 to be scheduled. For example, in the case that the wireless communication devices 306 to be scheduled are less than a predefined number (e.g., less than 50, or less than 10, as examples), the configuration without the virtual node may be provided, whereas in the case that the wireless communication devices 306 to be scheduled are more than the predefined number (e.g., more than 10, or more than 50, as examples), the configuration with the virtual node may be provided.

Considering a graph representation 322, the edge 334 between two nodes 332 may represent a mutual interaction between the two nodes 322, e.g. between two layers of a wireless communication device 306, or between layers of different wireless communication devices 306, or between a wireless communication device 306 and a virtual node 336 (e.g., the wireless network), depending on the configuration of the graph representation.

As mentioned above, the edges 334 of a graph representation 322 may be represented as an adjacency matrix, e.g. any suitable matrix with a number of rows and columns corresponding to the number of nodes 332. In the adjacency matrix, a matrix element i,j represents the edge between node i and node j of the graph representation. In a simple representation, an element of the adjacency matrix may have a value of 0 in case no interaction is present between the respective nodes 332 (and no edge 334 is present between those nodes), or may have a positive value less than or equal to 1 in case an interaction is present between the respective nodes 332 (and an edge 334 is present between those nodes).

There may be various ways to represent a mutual interaction in the context of scheduling in a wireless network. As an example, which has been found to provide an effective representation of the interaction, an edge 334 between a node 332 and another node 332 in a graph representation 322 may be associated with channel state information (CSI) of the node 332 and of the other node 322 (illustratively, channel state information of the wireless communication device(s) associated with the node and the other node, and/or of the layers associated with the node and the other node).

Channel state information, as known in the art, may represent the achievable spectral efficiency by a wireless communication device, and may be expressed in various manner as defined by the specification relevant for a certain radio communication technology. For example, channel state information may include one or more of: single-user Multiple-Input Multiple-Output precoding matrix indicator per sub-band; single-user Multiple-Input Multiple-Output beamformer; channel quality indicator per layer (e.g., per layer per sub-band); and/or rank indicator.

As a more advanced configuration with respect to the simple representation of edges 334 as 0s and 1s, it has been found that assigning a weight to the edges 334 may provide a deeper characterization of the interactions among the wireless communication devices 306. Illustratively, rather than considering merely the presence or absence of an interaction, the interactions may also be weighted, so that the more relevant interactions for a wireless communication device 306 with the other wireless communication devices 306 (or with the virtual node 336) are assigned a greater weight and the less relevant interactions for a wireless communication device 306 with the other wireless communication devices 306 (or with the virtual node 336) are assigned a lower weight. For example, a wireless communication device 306 may have more relevant interactions with other wireless communication devices 306 located in close proximity, and less relevant interactions with wireless communication devices 306 located farther away. This representation may include assigning a weight to each edge 334 of the graph representation 322, each weight representing a relevance of the (mutual) interaction between the nodes that the edge 334 connects. The edge weights may be attention scores, e.g. continuous values in the range from 0 to 1. A graph representation 322 (or sub-band graph representation) may include a plurality of attention scores, and each attention score may describe a weighted relationship between a node of the plurality of nodes 332 and another node of the plurality of nodes 322.

As an exemplary configuration, e.g. to provide simpler processing through the graph neural network model 314, the edges 334 between the virtual node 336 and nodes 332 associated with different layers of a same wireless communication device 306 may have same attention scores. Illustratively, in a graph representation 322 the edges 334 connecting the virtual node 336 and all the nodes associated with a same wireless communication device 306 have a same value of the attention score. This configuration may be based on the assumption that the communication scenario does not vary or varies negligibly among different layers of a same wireless communication device 306. With reference to FIG. 3C the edges 334 between the virtual node 346 and the UE nodes 332 may represent the attention scores given to those nodes. Since all layers of a UE are to be selected, all of them may get the same attention score.

Considering the graph representation 322c with the virtual node 336, the plurality of attention scores may describe a weighted relationship between the virtual node 336 and each other node of the plurality of nodes 332 (whereas the attention scores for the relationships among the other nodes 332 may be 0 since the nodes 332 are not connected to each other). Illustratively, the attention scores may be understood as learning values in the range from 0 to 1 (normalized) for the adjacency matrix.

As an exemplary representation of the attention scores, the input data 312 may include an attention matrix including the plurality of attention scores. The attention matrix may be a weighted version of the simple adjacency matrix with only 0s and 1s. Illustratively, a matrix element i,j of the attention matrix may represent a weighted interaction between node i and node j of the graph representation 322. A matrix element of the attention matrix (an attention score) may have any continuous value from 0 (absence of interaction) to 1 (most relevant interaction). An attention score may also be referred to as attention weight.

As described above, the graph representation 322 may include a plurality of graph representations with respective nodes 332 for each sub-band of the wireless network. As an exemplary configuration, each sub-band graph representation (of the sub-bands of a resource block group) may have a same attention matrix associated therewith. Illustratively, it may be assumed that the device-to-device interactions do not vary among different sub-bands.

Going back to FIG. 3B, the processing via trained graph neural network model 314 may be illustratively described as a "graph-in, graph-out" architecture, in which the attributes of a graph representation 322 (e.g., of each sub-band graph representation), such as the input feature vectors, the attention scores, etc. are updated by passing through a plurality of graph neural network layers 324, to provide an output graph representation 326 (e.g., a plurality of output sub-band graph representations) with updated attributes (e.g., updated feature vectors, updated attention scores, etc.). Illustratively, passing through the graph neural network layers 324, the information describing the network scenario gets updated taking into consideration the interactions among the wireless communication devices 306, so that the output graph representation 326 provides a comprehensive description of how the wireless communication devices 306 interact and behave in the wireless network.

The attributes of the output graph representation 326 (e.g., of each output sub-band graph representation) may provide determining the scheduled user set. The processor 302 may be configured to determine a prediction 328 from the output graph representation 326, which may be or include a node-level prediction, and/or an edge-level prediction, and/or a graph-level prediction. Illustratively, the processor 302 may be configured to instruct user scheduling based on the attributes of the output graph representation 326 (e.g., based on the attributes of each output sub-band graph representation).

As an example, the processor 302 may be configured to instruct user scheduling of the plurality of wireless communication devices 306 based on the edges 334o of the last graph neural network layer 324 of the trained graph neural network model 314 (illustratively, the edges 334o of the output graph representation 326), e.g. based on the attention scores associated with the edges 334o of the last graph neural network layer of the trained graph neural network model 314. Illustratively, the attention scores of the edges 334o of the output graph representation 326 may define the order of the wireless communication devices 306 for scheduling, e.g. with wireless communication devices 306 associated with greater scores (illustrated as thicker edges 334o) having a greater scheduling priority. The processor 302 may be configured to instruct user scheduling of the plurality of wireless communication devices 306 by ordering the plurality of wireless communication devices 306 for descending value of the associated attention scores. The attention scores may be the set of scores that the output data 316 of the graph neural network model 314 represents. It is however understood that other scheduling based on an interpretation of the output graph representation 326 may be provided. The processor 302 may be configured to perform user scheduling per sub-band, e.g. based on the respective attention scores of the output sub-band graph representations.

The propagation through the graph neural network layers 324 may thus provide determining, based on the properties of the wireless communication devices 306 and the respective interactions, a scheduled user set providing a high throughput and a reduced interference among the wireless communication devices. The propagation through the graph neural network layers 324 may provide evaluating how the wireless communication devices 306 interact and interfere with one another in the network scenario to define a scheduled user set that provides greater utility. Illustratively, the propagation through the graph neural network layers 324 may provide a characterization of the interactions among the wireless communication devices to be scheduled (and/or with the wireless network), which allows determining how the wireless communication devices are to be scheduled for resource allocation.

Figure 3E:
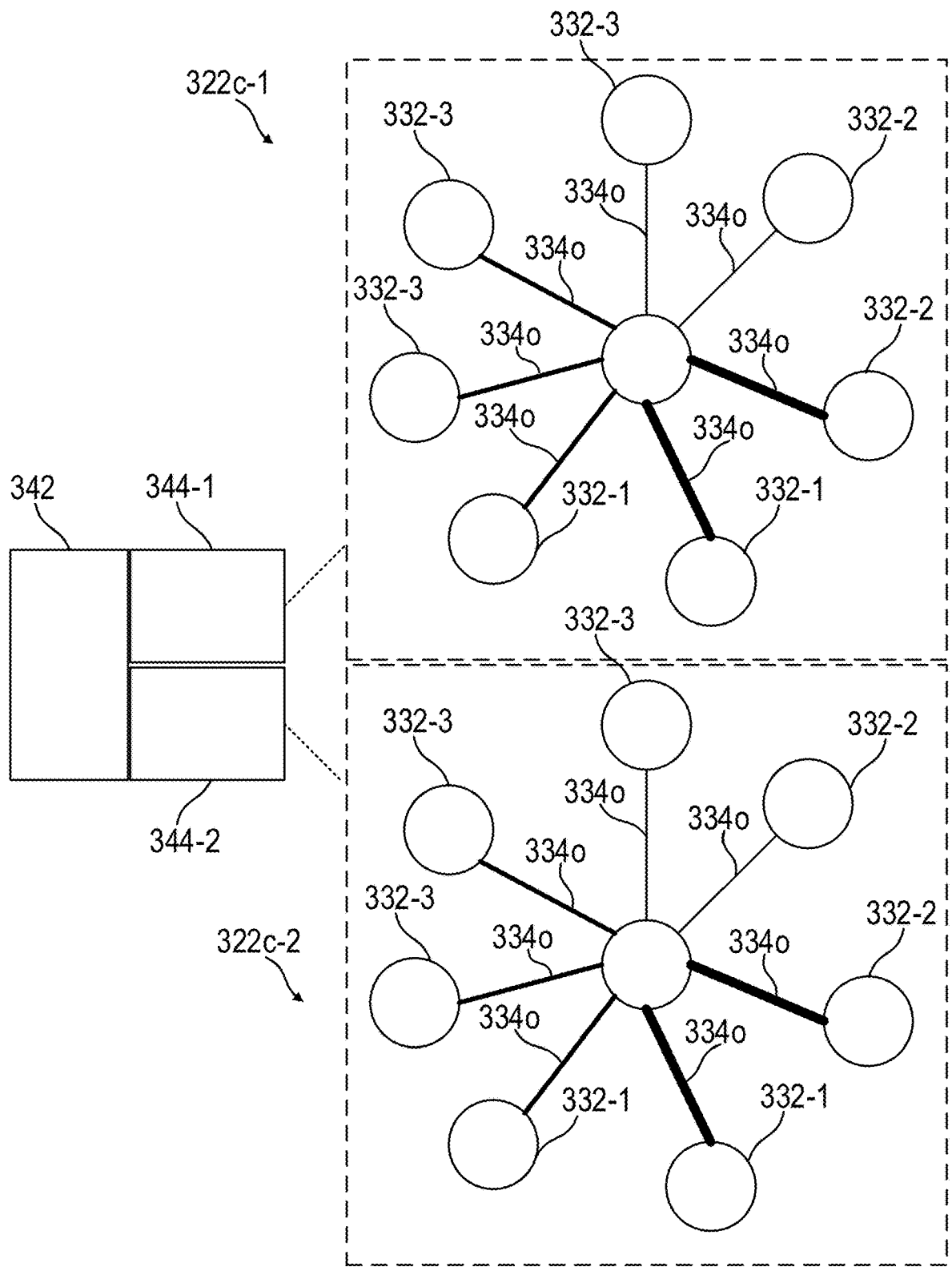
FIG. 3E and FIG. 3F show graph representations of wireless communication devices in a wireless network in a schematic representation, according to the present disclosure.
Figure 3F:
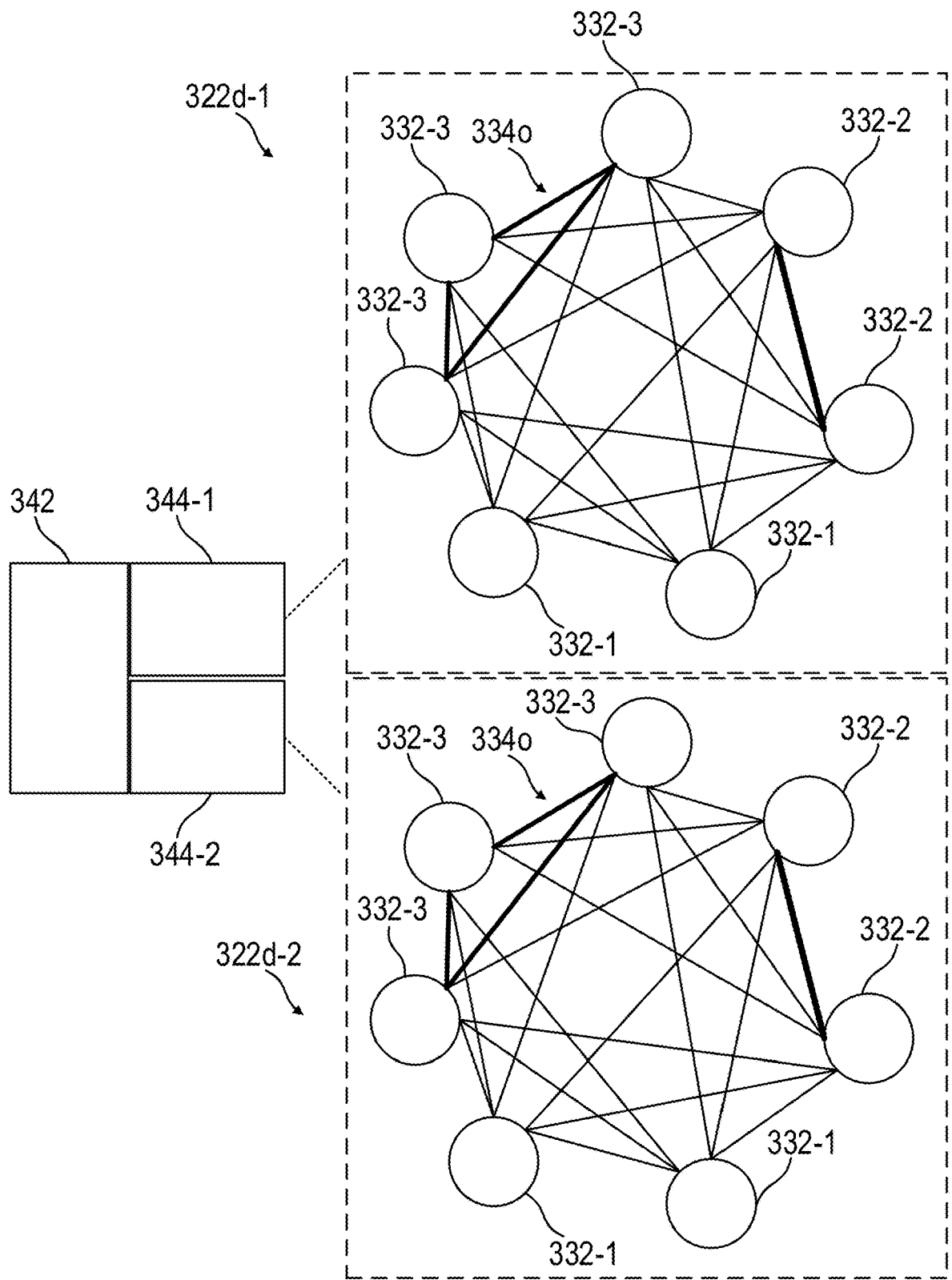

Graph representations with edges 334o having different attention scores after propagation through the graph neural network layers 324 are illustrated in FIG. 3E and FIG. 3F for the configuration with a virtual node 336 (FIG. 3E) and without a virtual node 336 (FIG. 3F). In FIG. 3E and FIG. 3F the graph representations associated a first sub-band 344-1 and a second sub-band 344-2 (of a same resource block group 342) are illustrated, e.g. a first sub-band graph representation 322c-1, 322d-1, and a second sub-band graph representation 322c-2, 322d-2, respectively. It is however understood that the number of sub-band graph representations may be scalable with the number of sub-bands. As mentioned above, the edges 334o have an attention score, and the high scored edges 334o (represented with thicker lines) may be selected for scheduling (illustratively, before or instead than selecting the low or lower scored edges). Further, as discussed above, edges 334o associated with a same wireless communication device in the sub-band graph representations for different sub-bands 344-1, 344-2 may have a same attention score (illustrated as lines with a same thickness in the different graph representations).

In the following, an exemplary propagation of a (input) graph representation 322 through the graph neural network layers 324 will be described, which has been found to provide a time- and resource-efficient propagation to provide the scheduled user set. It is however understood that other configurations for the propagation may be possible, e.g. with additional or alternative update functions, additional or alternative update rules, additional or alternative learnable weights, etc.

The trained graph neural network model 314 may include a plurality of graph neural network layers 324. As a numerical example, the plurality of graph neural network layers 324 may include at least 10 layers, for example at least 50 layers, for example at least 100 layers, for example at least 1000 layers.

Considering the presence of sub-bands in the wireless network, the trained graph neural network model 314 may include a respective plurality of graph neural network layers 324 for each sub-band of the wireless network, e.g. each sub-band of a (e.g., each) resource block group of one or more resource block groups of the wireless network. The sub-band graph representation(s) associated with a sub-band may propagate through the graph neural network layers associated with that sub-band.

Each graph neural network layer 324 may have a layer function associated therewith. The propagation through the graph neural network layers 324 may be understood as each layer 324 receiving a graph representation as input from the preceding layer 324, and providing an updated graph representation as output to be used as input for the subsequent layer 324. The first layer 324 may receive the input graph representation 322, and the last layer 324 may provide the output graph representation 326. The layer function of a graph neural network layer 324 may thus be configured to update attributes of nodes and/or edges of a graph representation input to the graph neural network layer 324 to provide an output graph representation of the layer 324 (as input for the subsequent layer 324) with updated attributes of nodes and/or edges.

The equations in the following may refer to the configuration of a graph representation with a virtual node 336. Illustratively, the equations in the following may refer to the neural network formulated as GNN with $\mathcal{N}$ +1 nodes, e.g. with number of nodes equal to total number of layers of all users, and one virtual central node. It is however understood that the equations and the discussion in the following may correspondingly apply to the configuration of a graph representation without a virtual node 336, or to other graph representations.

Then, combined feature vector including the input features vector (layer 0 of GNN, the first layer of the graph neural network layers 324) of sub-band s may be written for nodes as, $$F_s^0 = [0_{F_{in} \times 1}, f_{s,1,1}, f_{s,1,2}, \ldots, f_{s,|U|,|P_u|}]^T \in R^{(|\mathcal{N}|+1) \times F_{in}}$$

where the first vector $0_{F_{in} \times 1}$ is the virtual central node's input feature.

As an exemplary configuration, a diffusion convolutional GNN with attention weights at edges for layer l may be described as follows:

$$Z_s^l = A_s^l F_s^l W_a^l + C_s F_s^l W_c^l$$

$$F_s^{l+1} = \sigma(Z_s^l)$$

$$A_s^{l+1} = g(F_s^{l+1}, \forall s \text{ in } RBG)$$

where, $W_a^l$ and $W_c^l$, l=0, ..., L−1, where L is number of GNN layers, are learnable neural network weights with dimension $R^{F_{in} \times F_{out}}$ for l=0 and $R^{F_{out} \times F_{out}}$ for l>0 (illustratively, for the graph neural network layers 324 beyond the first one). $F_{out}$ is the output feature size.

Illustratively, the layer function ($Z_s^l$) of a graph neural network layer may include an attention matrix ($A_s^l$), a combined feature vector ($F_s^l$), and a correlation matrix ($C_s$). The attention matrix ($A_s^l$), combined feature vector ($F_s^l$), and correlation matrix ($C_s$) may be for the sub-band with which the graph representation is associated. Furthermore, the layer function may include first (learnable) weights ($W_a^l$) associated with the attention matrix and second (learnable) weights ($W_c^l$) associated with the correlation matrix of the graph neural network layer. The learnable weights may be parameters adapted during a training of the graph neural network model 314, as described in further detail below. The layer function ($Z_s^l$) of a graph neural network layer may thus include a sum between a first addend (a product of the attention matrix, the combined feature vector, and the first weights, $A_s^l F_s^l W_a^l$) and a second addend (a product of the correlation matrix, the combined feature vector, and the second weights, $C_s F_s^l W_c^l$).

The above operation is run for multiple layers 324, illustratively to propagate a graph representation through the graph neural network layers 324. The above operation may be run for each sub-band s∈S (through the respective graph neural network layers, for the respective graph representation). An activation function may provide the combined feature vector of the subsequent layer (l+1). Illustratively, the trained graph neural network model 314 may be configured to update the combined feature vector of a graph neural network layer 324 to provide an output combined feature vector (the combined feature vector of the subsequent layer) by an activation function having the layer function as function parameter. The activation function is denoted as σ(·), and for example may be or may include a sigmoid function.

An attention matrix update rule (function) is denoted as g(·), and is described in further detail below. Illustratively, the trained graph neural network model 314 may be configured to update the attention matrix of a graph neural network layer 324 to provide an output attention matrix (the attention matrix of the subsequent layer 324) by an update function having as function parameter the combined feature vector of the subsequent graph neural network layer. The function parameter of the update function may include the combined feature vectors of each subsequent graph neural network layer associated with a sub-band of the resource block group.

As mentioned above, grouping of multiple sub-bands for each user group selection (e.g., for MU-MIMO selection) may be considered. To consider these groupings and multiple rank selections for each user, the attention matrix $A_s^l$ may be configured such that the same user and all the layers of user gets the same attention weights.

As an example, the attention matrix may have the following structure for the first graph neural network layer 324, because the first layer does not have attention weights yet:

$$A_s^0 = \begin{bmatrix} 1 & 1 & 1 & 1 & 1 & 1 & 1 & 1 & \cdots \\ 1 & 1 & 0 & 0 & 0 & 0 & 0 & 0 & \cdots \\ 1 & 0 & 1 & 0 & 0 & 0 & 0 & 0 & \cdots \\ 1 & 0 & 0 & 1 & 0 & 0 & 0 & 0 & \cdots \\ 1 & 0 & 0 & 0 & 1 & 0 & 0 & 0 & \cdots \\ 1 & 0 & 0 & 0 & 0 & 1 & 0 & 0 & \cdots \\ 1 & 0 & 0 & 0 & 0 & 0 & 1 & 0 & \cdots \\ 1 & 0 & 0 & 0 & 0 & 0 & 0 & 1 & \cdots \\ \vdots & \vdots & \vdots & \vdots & \vdots & \vdots & \vdots & \vdots & \ddots \end{bmatrix} \in R^{(|\mathcal{N}|+1) \times (|\mathcal{N}|+1)}$$

For the subsequent graph neural network layers 324 (l>0), an example attention matrix may be as follows (e.g., attention matrix of the example graph representation in FIG. 3C and FIG. 3E is the first 8 columns and rows of the following matrix):

$$A_s^l = \begin{bmatrix} 1 & a_1^l & a_1^l & a_2^l & a_2^l & a_3^l & a_3^l & a_3^l & \cdots \\ a_1^l & 1 & 0 & 0 & 0 & 0 & 0 & 0 & \cdots \\ a_1^l & 0 & 1 & 0 & 0 & 0 & 0 & 0 & \cdots \\ a_2^l & 0 & 0 & 1 & 0 & 0 & 0 & 0 & \cdots \\ a_2^l & 0 & 0 & 0 & 1 & 0 & 0 & 0 & \cdots \\ a_3^l & 0 & 0 & 0 & 0 & 1 & 0 & 0 & \cdots \\ a_3^l & 0 & 0 & 0 & 0 & 0 & 1 & 0 & \cdots \\ a_3^l & 0 & 0 & 0 & 0 & 0 & 0 & 1 & \cdots \\ \vdots & \vdots & \vdots & \vdots & \vdots & \vdots & \vdots & \vdots & \ddots \end{bmatrix} \in R^{(|\mathcal{N}|+1) \times (|\mathcal{N}|+1)}$$

In the above, the attention matrix may be per GNN layer and per sub-band. In other words, each layer and sub-band may or may not have different attention weights.

As an exemplary configuration, as described above, different sub-bands of a resource block group may have the same attention matrix, and each layer (e.g., MIMO layer) of a user may have the same attention score as given in the above matrix.

In case the attention matrix is same for each sub-band in an RBG, an element of the attention matrix may be as follows, $$\alpha_u^l = g(E_1(F_s^l)_0, \{E_2(F_s^l), \forall j \in \text{ layers of } UE \text{ u in } RBG\})$$

where, j is index of a layer (e.g., MIMO layer) of a user in all sub-bands of RGB, $E_1 \in R^{F_{out} \times F_{out}}, E_2 \in R^{F_{out} \times F_{out}}$ may be learnable weights. Here, $(F_s^l)_0$ is the first column of $F_s^l$ which captures hidden features of virtual node. $(F_s^l)_1$ is the $j^{th}$ column of $F_s^l$ corresponding to MIMO layers of UE u.

As an example, the update function g(·) may be $$\alpha_u^l = \sigma\left(b^T\left[E_1(F_s^l)_0 \| \frac{\sum_{\forall j \in \text{all layers of } UE \text{ u in } RBG} E_2(F_s^l)_j}{\# \text{ of all layers of } UE \text{ u in } RBG}\right]\right)$$

In the above, $b \in R^{2F_{out} \times 1}, E_1 \in R^{F_{out} \times F_{out}}, E_2 \in R^{F_{out} \times F_{out}}$ may be learnable weights of the graph neural network. Illustratively, for each attention score associated with a node of the attention matrix to be updated, the update function may include as function parameter the input feature vector of the node. For each attention score associated with a node of the attention matrix to be updated, the update function may include as function parameter a sum of the input feature vectors of the node over all the layers of the node in the resource block group. The update function further includes third (learnable) weights associated with the input feature vectors of the node. Considering the exemplary update function above, the update function may include the sum of the input feature vectors as dividend and the number of layers of the node in the resource block group as divisor, and may include fourth (learnable) weights associated with the number of layers. The update function may include an activation function σ, e.g. a sigmoid or a rectified linear activation unit as examples. The attention matrix element $\alpha_{u}^{l}$ may be computed per layer to have the same attention matrix between sub-bands of RBG. Updating attention weights between GNN layers may improve user selection at the last layer of GNN. The attention weights of the last layer may then be used to pick the user group. The propagation through the GNN layers 324 may be provided for each sub-band of a resource block group, before performing user scheduling for the next resource block group.

The GNN-based solution may be summarized as follows. For each RBG, all the user's features may be obtained, and a form of correlation matrices may be computed per sub-band. The graph that is formed as a result of the UE data is then fed through L layers of the GNN and the users are picked at the end of the L layers. The GNN approach may thus avoid iterating over several UE groups unlike the naive (exhaustive search) and the greedy algorithm. The GNN may take in all the users and perform linear complexity operations on the users to output the users to be selected in one go.

The GNN-approach may thus provide a reduction in complexity compared to other approaches, e.g. compared to the greedy algorithm. Considering for example a scenario with a user rank 4, the real multiplication per RBG with a greedy algorithm may be $10.89 \times 10^6$, whereas with the GNN-approach may be $1.28 \times 10^6$, providing a reduction in complexity with the GNN of 88.2%. Considering a scenario with a user rank 3, the real multiplication per RBG with a greedy algorithm may be $13.04 \times 10^6$, whereas with the GNN-approach may be $0.98 \times 10^6$, providing a reduction in complexity with the GNN of 92.5%. Considering a scenario with a user rank 2, the real multiplication per RBG with a greedy algorithm may be $6.06 \times 10^6$, whereas with the GNN-approach may be $0.47 \times 10^6$, providing a reduction in complexity with the GNN of 92.2%. Considering a scenario with a user rank 1, the real multiplication per RBG with a greedy algorithm may be $1.75 \times 10^6$, whereas with the GNN-approach may be $0.145 \times 10^6$, providing a reduction in complexity with the GNN of 91.7%.

The GNN approach may thus provide about 10× reduction in complexity compared to using the greedy algorithm. Additionally, tests using behavior cloning showed that selecting users using the GNN technique may provide 99% of weighted sum rate of the users (e.g., using simple supervised learning training techniques).

Figure 4B:
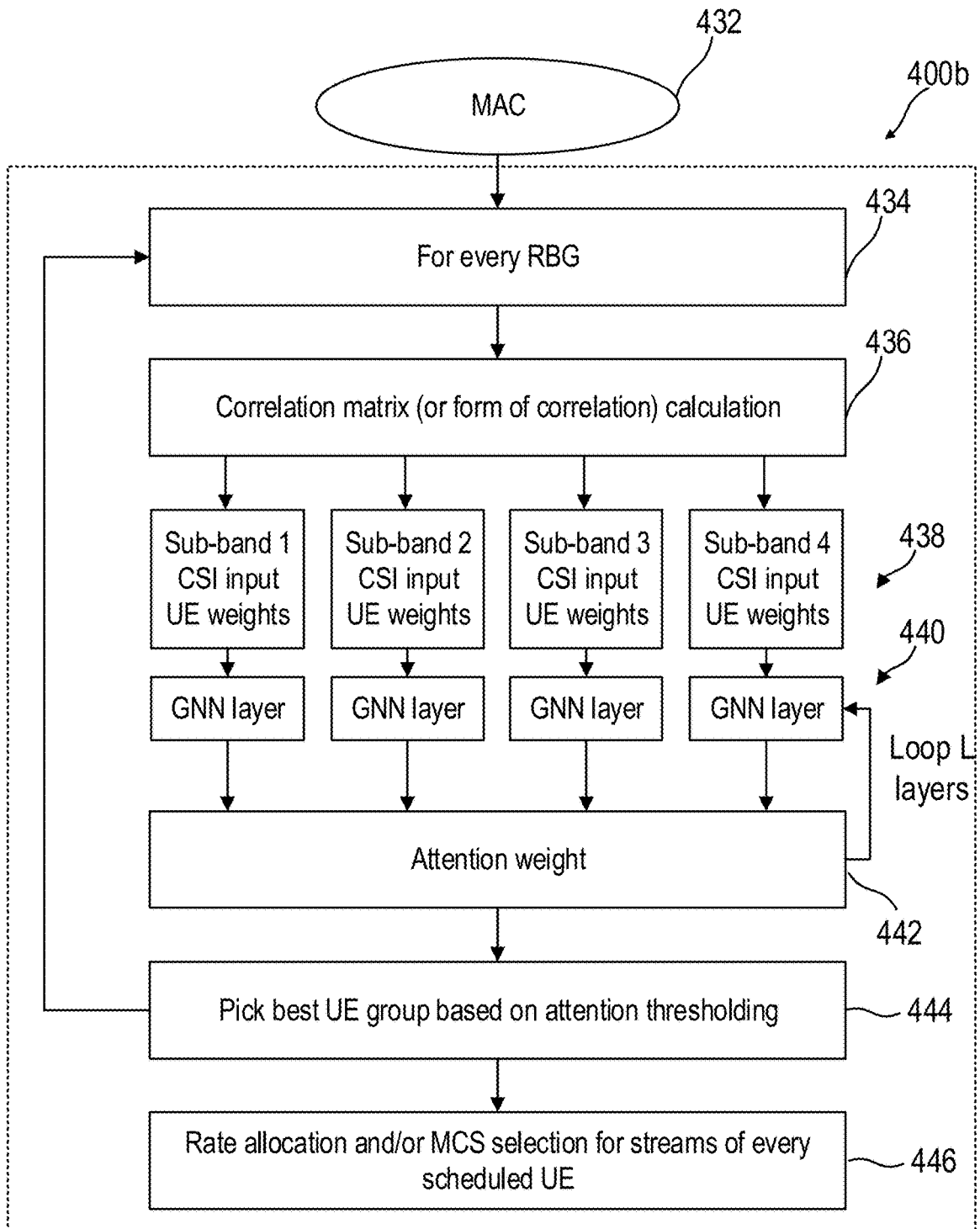

FIG. 4A and FIG. 4B show a flow diagram of a method 400a, 400b of performing user scheduling in a wireless network by using a graph neural network model, according to the present disclosure. The method 400a, 400b may be based on the user scheduling method 310 and graph neural network model 314 described in relation to FIG. 3A to FIG. 3F, so that a repetition of the concepts already discussed above will be omitted. It is however understood that the discussion above in relation to the device 300 may apply in a corresponding manner to the method 400a, 400b. The method 400a, 400b may be a computer-implemented method.

In general, the method 400a, 400b may include performing user scheduling in a wireless network by determining a scheduled user set using a trained graph neural network model.

The method 400a, in FIG. 4A, may include, in 410, providing input data to a trained graph neural network model (e.g., the trained graph neural network model 314), the input data being indicative of a graph representation of a plurality of wireless communication devices. The method 400a may further include (not shown) generating the input data, e.g. based on a knowledge of the wireless communication devices to be scheduled, e.g. on known properties (such as known channel state information, etc.). Illustratively, the method 400a may include generating a graph representation (e.g., a respective graph representation per sub-band) based on information on the wireless communication devices (e.g., feedback data that the wireless communication devices may provide, e.g. at a network access node).

The trained graph neural network model may be configured to provide output data representative of a scheduled user set including the plurality of wireless communication devices (e.g., output data including a set of scores representative of the scheduled user set). The method 400a may further include, in 420, performing user scheduling of the plurality of wireless communication devices based on the output data of the trained graph neural network model. As another configuration, the method 400a may include instructing user scheduling of the plurality of wireless communication devices based on the output data of the trained graph neural network model. As an example, performing user scheduling may include allocating resource to the wireless communication devices based on the set of (e.g., attention) scores, e.g. in descending order of scores. Illustratively, resources may be allocated first to the wireless communication device with the greatest score, then to the wireless communication device with the second greatest score, and so on.

The method 400b, in FIG. 4B, may be an exemplary configuration of the user scheduling method for an exemplary scenario. It is however understood that the method 400b may correspondingly apply to other scenarios (e.g., with different number of sub-bands, with a different selection strategy, etc.). The flow diagram in FIG. 4B may be from the standpoint of a processor configured to perform the GNN-based user scheduling described herein (e.g., the processor 302), for example configured as MAC scheduler 432.

The method 400b may be as follows. For every resource block group (434), the method 400b may include calculating (436) a correlation matrix (or some form of correlation), e.g. a correlation among the wireless communication devices to be scheduled. Then, the method 400b may include, for each sub-band (e.g., four sub-bands in the exemplary configuration in FIG. 4B) providing (438) a CSI input and weights associated with the wireless communication devices (UE weights). Illustratively, the method 400b may include providing a graph representation for each sub-band. The method 400b may further include propagating (440) the graph representation for each sub-band through the GNN layers of that sub-band (looping over the L layers) to update (442) the attention weights associated with the edges of the graph representation(s). After propagation through the L layers of the graph neural network model, the method 400b may include selecting (444) the scheduled user set based on the attention scores of the final layer of the graph neural network model (picking the best UE group, e.g. providing the greatest throughput, based on attention thresholding). The scheduling may then be performed for the next resource block group (the method 400b may include going back to 434). Finally, the method 400b may include rating (446) the allocation or modulation and coding scheme selection (MCS selection) for streams of every scheduled wireless communication device (e.g., every scheduled UE).

In the following, e.g. in relation to FIG. 5, a method of training a graph neural network model (e.g., the graph neural network model 314) will be described. It is understood that the training method(s) described herein is exemplary to provide training of a graph neural network suitable for user scheduling in a wireless network, and that other training methods (e.g., with different rewards, different weight adjustments, etc.) may be provided.

Figure 5:
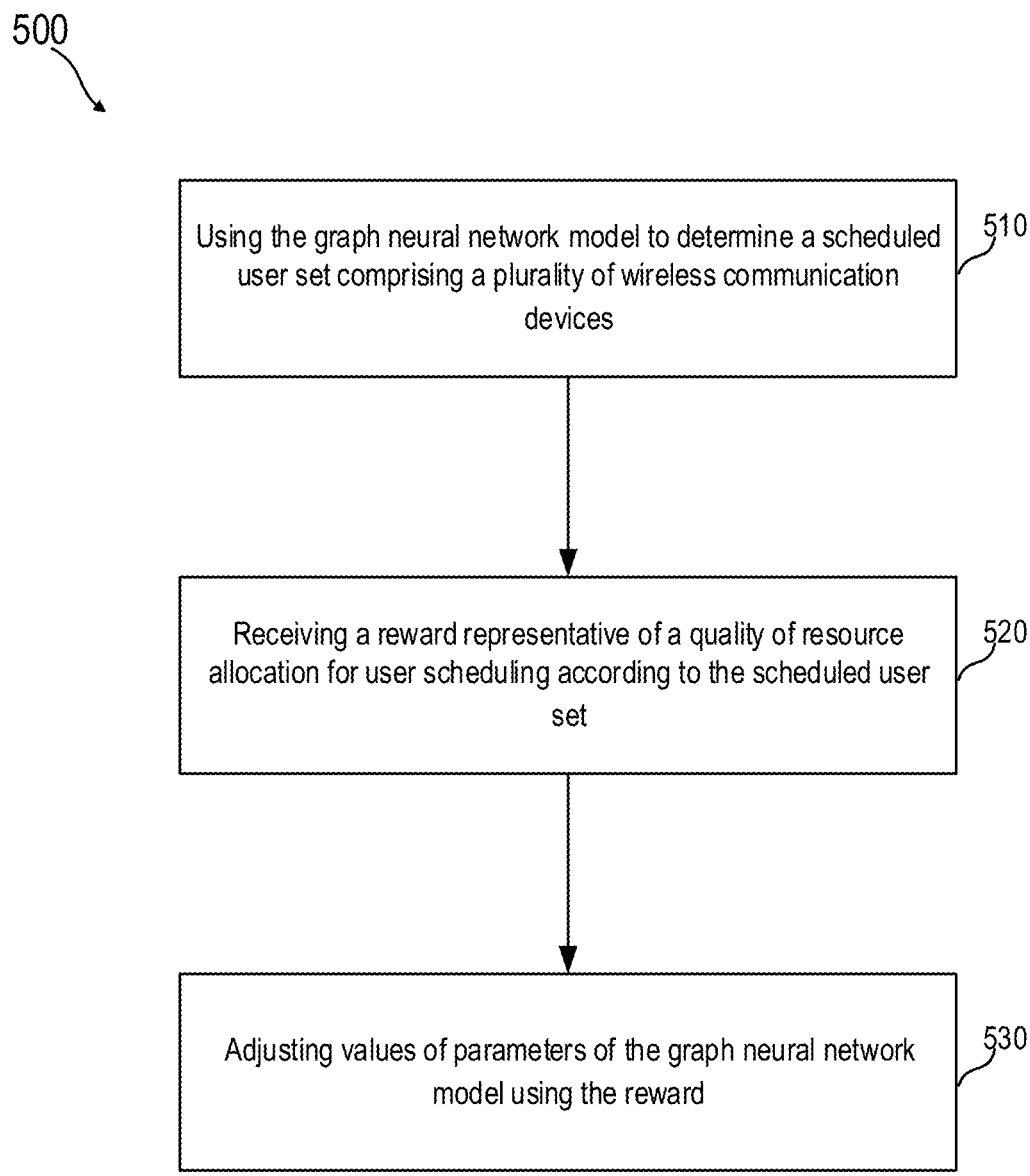
FIG. 5 shows a flow diagram of a method of training a graph neural network used for user scheduling in a wireless network according to the present disclosure.

FIG. 5 shows a flow diagram of a method 500 of computer-implemented training a graph neural network model used for user scheduling in a wireless network according to the present disclosure. The trained graph neural network model (e.g., the trained graph neural network model 314) may be trained according to the method 500. A processor (e.g., the processor 302) may be configured to train a graph neural network model according to the method 500. In general, the training may be supervised or unsupervised. As an example, training of the graph neural network may include reinforcement learning techniques. A processor (e.g., the processor 302) may be configured to automatically update a graph neural network model, e.g. based on training and/or learning, e.g. based on collecting and/or receiving data representative of a performance of user scheduling performed using the graph neural network model. Illustratively, a processor (e.g., the processor 302) may be configured to automatically adjust an architecture of a graph neural network model (e.g., a number of nodes, a type of edges, a type of node embedding, learnable weights, propagation functions, etc.) with the aim of maximizing a performance of user scheduling performed using the graph neural network model.

The method 500 may include, in 510, using the graph neural network model to determine a scheduled user set including a plurality of wireless communication devices. The method 500 may include, in 520, receiving a reward representative of a quality of resource allocation for user scheduling according to the scheduled user set. The method 500 may include, in 530, adjusting values of parameters of the graph neural network model using the reward.

By way of illustration, the method 500 may include using the graph neural network model to determine how resources should be allocated to a plurality of wireless communication devices, and adjusting the graph neural network model based on the quality of the resource allocation determined with the model.

Using the graph neural network model to determine a scheduled user set, 510, may include providing to the graph neural network model input data indicative of a graph representation of the wireless communication devices, and generating output data representative of the scheduled user set (e.g., output data including a set of scores). The scheduled user set may also have a predicted performance score associated therewith.

Then, the method 500 may include performing user scheduling based on the determined scheduled user set, e.g., may include allocating resources to the plurality of wireless communication devices based on the scheduled user set. For example, the training may be carried out in a test wireless network with test wireless communication devices (e.g., with known properties, known interactions, etc.). As another example, performing user scheduling may include simulating a resource allocation based on the scheduled user set, e.g. with a computer. As a further example, user scheduling according to the scheduled user set may be compared with user scheduling according to a known method (e.g., to a known algorithm), as discussed in further detail below.

Receiving a reward representative of a quality of resource allocation for user scheduling according to the scheduled user set, 520, may include, for example determining (e.g., calculating, or estimating) a throughput of the wireless network in the user scheduling configuration that the scheduled user set defines. The reward may be, for example, based on a difference between the throughput associated with the scheduled user set determined using the graph neural network model and a target throughput (e.g., an ideal, e.g. maximum, throughput of the wireless network). As another example, the reward may be based on a difference between the scheduling order defined by the graph neural network model and a target scheduling order (known to provide a high throughput, e.g. a throughput above a predefined threshold).

Adjusting values of parameters of the graph neural network model using the reward, 530, may include adjusting learnable weights of the graph neural network model (e.g., the weights of a layer function and/or an update function of the model, e.g. the first, second, third, and/or fourth learnable weight of the graph neural network model 314). Illustratively, the training may include adjusting the parameters with the aim of increasing (e.g., maximizing) the reward, e.g. with the aim of providing a scheduled user set with a throughput close or equal to the target throughput of the wireless network.

As an example, training the graph neural network model may include adapting first weighting factors (associated with an attention matrix) and second weighting factors (associated with a correlation matrix) of a layer function of a graph neural network layer of the graph neural network model. Adapting the (first and second) weighting factors may be based on target data (e.g., the target throughput). As an example, the target data may include a (target) scheduled user set associated with a utility parameter above a predefined threshold (illustratively, a throughput above a predefined threshold, e.g. a throughput in a predefined range). The method 500 may include adapting the weighting factors such that the predicted performance score for the scheduled user set is increased. Illustratively, the reward may (additionally or alternatively) be based on a difference between the scores determined with the graph neural network model and the scores associated with the target scheduled user set.

Additionally or alternatively, training the graph neural network model may include adapting third weighting factors (associated with input feature vectors of a node) and/or fourth weighting factors (associated with a number of layers of the node, e.g. of the wireless communication device associated with that node). The method 500 may include adapting the third weighting factors and the fourth weighting factors based on the target data (to increase the predicted performance score).

In an exemplary configuration, the method 500 may include determining the reward based on the output of a known algorithm for user scheduling implemented on the same input data. Illustratively, training the graph neural network model may include cloning the output of a known scheduling algorithm (e.g., the greedy scheduling algorithm) performed on the input data.

As an additional or alternative configuration, the method 500 of training the graph neural network model may include (e.g., for determining the reward) comparing the output of the graph neural network model with the output of a known method (a known algorithm) of user scheduling, e.g. with the output of a greedy algorithm. Since feasible algorithms (e.g., greedy) exist, that provide a suboptimal but reasonable solution, the GNN may be trained using behavior cloning technique.

The method 500 may include using as input for the graph neural network model and the known (e.g., greedy) algorithm input data describing same properties of the wireless communication devices, e.g. layer CQI per sub-band, overall CQI per sub-band, the rank of the wireless communication device(s), the weight wireless communication device(s), etc., as described above.

The output of the graph neural network model in general are a set of continuous scores in the range from 0 to 1 (in case the last activation layer is sigmoid). The training data in case of a greedy algorithm has a set of scores that are either 0 or 1 (and nothing in between) as the greedy algorithm selects a set of users per sub-band. Then, for training the graph neural network, the method 500 may include using binary cross entropy (similar to multi-label classification).

As an additional or alternative way to train the graph neural network, the method 500 may include using reinforcement learning (RL) techniques. For example, the method 500 may include using RL frameworks that are born out of policy gradient algorithms, such as Actor-Critic policies.

In the following, various examples are provided that refer to the device 300, processor 302, graph neural network model 314, and methods 400a, 400b, 500.

Example 1 is a device for use in a wireless network, the device including: a processor configured to: provide input data to a trained graph neural network model, the input data being indicative of a graph representation of a plurality of wireless communication devices, wherein the trained graph neural network model is configured to provide output data representative of a scheduled user set including the plurality of wireless communication devices; and instruct user scheduling of the plurality of wireless communication devices based on the output data of the trained graph neural network model.

As an example, the output data may include a set of scores, and each score of the set of scores may be associated with a wireless communication device of the plurality of wireless communication devices (e.g., may be representative of a priority of that wireless communication device for user scheduling).

In Example 2, the device of example 1 may optionally further include that the input data includes correlation data representative of a correlation among the wireless communication devices of the plurality of wireless communication devices.

In Example 3, the device of example 2 may optionally further include that the correlation data includes a correlation matrix representative of the correlation among the wireless communication devices.

In Example 4, the device of example 2 or 3 may optionally further include that the correlation data are representative of the correlation among the wireless communication devices for each resource block group of one or more resource block groups of the wireless network.

In Example 5, the device of example 4 may optionally further include that for each resource block group of the one or more resource block groups, the correlation data are representative of the correlation among the wireless communication devices for each sub-band of the resource block group.

In Example 6, the device of any one of examples 2 to 5 may optionally further include that the correlation data includes a pairwise signal-to-interference-plus-noise ratio among the wireless communication devices.

In Example 7, the device of example 6 may optionally further include that, for each resource block group of the one or more resource block groups, the pairwise signal-to-interference-plus-noise ratio is for each sub-band of the resource block group.

In Example 8, the device of any one of examples 1 to 7 may optionally further include that the graph representation includes a plurality of nodes associated with the plurality of wireless communication devices, and a plurality of edges associated with interactions among the plurality of wireless communication devices.

In Example 9, the device of example 8 may optionally further include that the plurality of nodes includes, for each wireless communication device of the plurality of wireless communication devices, a number of nodes corresponding to a number of layers associated with the wireless communication device.

In Example 10, the device of example 8 or 9 may optionally further include that the number of nodes associated with a wireless communication device of the plurality of wireless communication devices is dependent on (e.g., corresponds to) a rank of the wireless communication device.

In Example 11, the device of any one of examples 1 to 10 may optionally further include that the graph representation includes a respective (sub-band) graph representation for each sub-band of a resource block group of one or more resource block groups of the wireless network.

In Example 12, the device of example 11 may optionally further include that each (sub-band) graph representation includes, for each wireless communication device of the plurality of wireless communication devices, a number of nodes corresponding to a number of layers associated with the wireless communication device in the respective sub-band.

In Example 13, the device of example 11 or 12 may optionally further include that each (sub-band) graph representation has a same number of nodes and a same number of edges.

In Example 14, the device of any one of examples 8 to 13 may optionally further include that each node of the plurality of nodes has an input feature vector associated therewith, the input feature vector being indicative of one or more features of the wireless communication device associated with the node (e.g., of the layer of the wireless communication device associated with the node).

In Example 15, the device of example 14 may optionally further include that the one or more features of the wireless communication device include one or more of: layer signal-to-interference-and-noise ratio (e.g., a MIMO layer SINR), a user weight, a precoding vector, and/or combinations thereof.

In Example 16, the device of example 14 or 15 may optionally further include that the input feature vector includes an input feature vector per layer of the wireless communication device.

In Example 17, the device of example 16 may optionally further include that the input feature vector includes an input feature vector per layer of the wireless communication device in each sub-band of the resource block group.

In Example 18, the device of any one of examples 8 to 17 may optionally further include that each node of the plurality of nodes is connected with each other node of the plurality of nodes.

In Example 19, the device of any one of examples 8 to 17 may optionally further include that the graph representation further includes a virtual node not associated with any wireless communication device of the plurality of wireless communication devices. The virtual node may be representative of the wireless network.

In Example 20, the device of example 19 may optionally further include that the virtual node is connected with each (other) node of the plurality of nodes.

In Example 21, the device of any one of examples 8 to 20 may optionally further include that an edge between a node of the plurality of nodes and another node of the plurality of nodes is associated with device state information of the node and of the other node.

In Example 22, the device of example 21 may optionally further include that the channel state information includes one or more of: single-user Multiple-Input Multiple-Output precoding matrix indicator per sub-band; single-user Multiple-Input Multiple-Output beamformer; channel quality indicator per layer per sub-band; and/or rank indicator.

In Example 23, the device of any one of examples 8 to 22 may optionally further include that the graph representation further includes a plurality of attention scores, each attention score describing a weighted relationship between a node of the plurality of nodes and another node of the plurality of nodes.

In Example 24, the device of example 23 may optionally further include that the graph representation includes an attention matrix including the plurality of attention scores.

In Example 25, the device of example 23 or 24 may optionally further include that the graph representation includes a same attention matrix for each sub-band of the resource block group.

In Example 26, the device of any one of examples 23 to 25 may optionally further include that the plurality of attention scores describes a weighted relationship between the virtual node and each other node of the plurality of nodes.

In Example 27, the device of example 26 may optionally further include that the edges between the virtual node and nodes associated with different layers of a same wireless communication device have same attention scores.

In Example 28, the device of any one of examples 8 to 27 may optionally further include that the input data includes a combined feature vector including the input feature vectors of the plurality of nodes.

In Example 29, the device of example 28 may optionally further include that for each sub-band, the input data includes a combined feature vector including the input feature vectors of the plurality of nodes associated with the sub-band.

In Example 30, the device of any one of examples 1 to 29 may optionally further include that the trained graph neural network model includes a plurality of graph neural network layers, that each graph neural network layer of the plurality of graph neural network layers has a layer function associated therewith, and that the layer function of a graph neural network layer is configured to update attributes of nodes and/or edges of a graph representation input to the graph neural network layer to provide an output graph representation with updated attributes of nodes and/or edges.

In Example 31, the device of example 30 may optionally further include that the trained graph neural network model includes a respective plurality of graph neural network layers for each sub-band of a resource block group of one or more resource block groups of the wireless network.

In Example 32, the device of example 30 or 31 may optionally further include that the processor is configured to instruct user scheduling of the plurality of wireless communication devices based on the edges output of the last graph neural network layer of the trained graph neural network model.

In Example 33, the device of any one of examples 30 to 32 may optionally further include that the processor is configured to instruct user scheduling of the plurality of wireless communication devices based on a value of the attention scores associated with the edges output of the last graph neural network layer of the trained graph neural network model.

In Example 34, the device of example 33 may optionally further include that the processor is configured to instruct user scheduling of the plurality of wireless communication devices by ordering the plurality of wireless communication devices for descending value of the associated attention scores.

In Example 35, the device of any one of examples 30 to 34 may optionally further include that the layer function of a graph neural network layer includes an attention matrix, a combined feature vector, and a correlation matrix.

In Example 36, the device of example 35 may optionally further include that the layer function further includes first (learnable) weights associated with the attention matrix and second (learnable) weights associated with the correlation matrix of the graph neural network layer.

In Example 37, the device of example 36 may optionally further include that the layer function includes a sum between a first addend and a second addend, that the first addend includes a product of the attention matrix, the combined feature vector, and the first weights, and that the second addend includes a product of the correlation matrix, the combined feature vector, and the second weights.

In Example 38, the device of any one of examples 35 to 37 may optionally further include that the trained graph neural network model is configured to update the combined feature vector of a graph neural network layer to provide an output combined feature vector (as input for a subsequent graph neural network layer) by an activation function having the layer function as function parameter. As an example, the activation function may include a sigmoid function.

In Example 39, the device of any one of examples 35 to 38 may optionally further include that the trained graph neural network model is configured to update the attention matrix of a graph neural network layer to provide an output attention matrix (as attention matrix for the subsequent graph neural network layer) by an update function having as function parameter the combined feature vector of a subsequent graph neural network layer. As examples, the update function may be or include a sigmoid or a rectified linear activation unit.

In Example 40, the device of example 39 may optionally further include that the function parameter includes the combined feature vectors of each subsequent graph neural network layer associated with a sub-band of the resource block group.

In Example 41, the device of example 39 or 40 may optionally further include that, for each attention score associated with a node of the attention matrix to be updated, the update function includes as function parameter the input feature vector of the node.

In Example 42, the device of example 41 may optionally further include that, for each attention score associated with a node of the attention matrix to be updated, the update function includes as function parameter a sum of the input feature vectors of the node over all the layers of the node in the resource block group.

In Example 43, the device of any one of examples 39 to 42 may optionally further include that the update function further includes third (learnable) weights associated with the input feature vectors of the node.

In Example 44, the device of any one of examples 39 to 43 may optionally further include that the update function includes the sum of the input feature vectors as dividend and the number of layers of the node in the resource block group as divisor.

In Example 45, the device of example 44 may optionally further include that the update function further includes fourth (learnable) weights associated with the number of layers.

In Example 46, the device of any one of examples 1 to 45 may optionally further include that the device is a medium access control scheduler or includes a medium access control scheduler.

In Example 47, the device of any one of examples 1 to 46 may optionally further include that the trained graph neural network model is configured as a xAPP in a radio access network intelligent controller, or that the processor is configured to access the trained graph neural network in a distributed unit of a radio access network of the wireless network.

In Example 48, the device of any one of examples 1 to 47 may optionally further include that the trained graph neural network model is or includes a diffusion convolutional graph neural network.

In Example 49, the device of any one of examples 1 to 48 may optionally further include a memory storing the trained graph neural network model. As another example, additionally or alternatively, the memory may be storing the input data provided to the trained graph neural network model and/or the output data from the trained graph neural network model.

Example 50 is a network access node (e.g., a base station, eNodeB, gNodeB) including the device according to any one of examples 1 to 49.

In Example 51, the device access node of example 50 may optionally further include that the input data is indicative of a graph representation of a plurality of wireless communication devices served by the network access node.

Example 52 is a method of operating a wireless network (e.g., a method of performing user scheduling in a wireless network), the method including: providing input data to a trained graph neural network model, the input data being representative of wireless communication device information associated with a plurality of wireless communication devices, wherein the trained graph neural network model is configured to provide output data representative of a scheduled user set including the plurality of wireless communication devices; and performing user scheduling of the plurality of wireless communication devices based on the output data of the trained graph neural network model.

As an example, the output data may include a set of scores, and each score of the set of scores may be associated with a wireless communication device of the plurality of wireless communication devices (e.g., may be representative of a priority of that wireless communication device for user scheduling).

In Example 53, the method of example 52 may include one or more features of any one of examples 1 to 49, adapted accordingly.

Example 54 is a non-transitory computer readable medium including instructions which, when the instructions are executed by a computer (e.g., by one or more processors of a network access node, e.g. by one or more processors of a base station), cause the computer to carry out the method of example 52 or 53.

Example 55 is a computer program product including instructions which, when the program is executed by a computer (e.g., by one or more processors of a network access node, e.g. by one or more processors of a base station), cause the computer to carry out the method of example 52 or 53. As an example, the computer program product may be a xAPP for a near-real time RIC.

Example 56 is a computer-implemented method for training a graph neural network used for user scheduling in a wireless network, the method including: using the graph neural network to determine a scheduled user set including a plurality of wireless communication devices; receiving (or determining) a reward representative of a quality of resource allocation for user scheduling according to the scheduled user set; and adjusting values of parameters (e.g., learnable weights) of the graph neural network using the reward.

In Example 57, the device of any one of examples 1 to 49 may optionally further include that the trained graph neural network model is trained with the method of example 56.

Example 58 is a non-transitory computer readable medium including instructions which, when the instructions are executed by a computer (e.g., by one or more processors of a network access node, e.g. by one or more processors of a base station), cause the computer to carry out the method of example 56.

Example 59 is a computer program product including instructions which, when the program is executed by a computer (e.g., by one or more processors of a network access node, e.g. by one or more processors of a base station), cause the computer to carry out the method of example 56.

Example 60 is a device for use in a wireless network, the device including: processing means for providing input data to a trained graph neural network model, the input data being indicative of a graph representation of a plurality of wireless communication devices, wherein the trained graph neural network model is configured to provide output data indicative of a scheduled user set including the plurality of wireless communication devices; and for instructing user scheduling of the plurality of wireless communication devices based on the output data of the trained graph neural network model.

Example 61 is a processor configured to: provide input data to a trained graph neural network model, the input data being indicative of a graph representation of a plurality of wireless communication devices, wherein the trained graph neural network model is configured to provide output data indicative of a scheduled user set including the plurality of wireless communication devices; and instruct user scheduling of the plurality of wireless communication devices based on the output data of the trained graph neural network model.

Example 62 is a method of computer-implemented training of a graph neural network model for user scheduling in a wireless network, the method including: providing to the graph neural network model input data representative of wireless communication device information associated with a plurality of wireless communication devices, to generate output data including a set of scores, the set of scores being representative of a scheduled user set with associated predicted performance score, the scheduled user set including the plurality of wireless communication devices, wherein the graph neural network model includes, for each sub-band of a resource block group of one or more resource block groups, a plurality of graph neural network layers, wherein each graph neural network layer of the plurality of graph neural network layers has a layer function associated therewith, the layer function including an attention matrix with associated first weighting factors, a feature vector, and a correlation matrix with associated second weighting factors; and training the graph neural network model by adapting the first weighting factors and the second weighting factors based on target data in which a scheduled user set is associated with a utility parameter above a predefined threshold, such that the predicted performance score for the scheduled user set is increased.

In Example 63, the method of example 64 may optionally further include that the trained graph neural network model is configured to update the attention matrix of a graph neural network layer into the attention matrix of a subsequent graph neural network layer by an update function having as function parameter the feature vectors of the subsequent graph neural network layer associated with each sub-band of the resource block group, that the update function includes third weighting factors associated with input feature vectors of a node in the resource block group and fourth weighting factors associated with a number of layers of the node in the resource block group, and that the method further includes training the graph neural network model by adapting the third weighting factors and the fourth weighting factors based on the target data.

In Example 64, the method of example 62 or 63 may optionally further include that training the graph neural network model includes cloning the output of a greedy scheduling algorithm performed on the input data.

In Example 65, the device of any one of examples 1 to 49 may optionally further include that the trained graph neural network model is trained with the method of any one of examples 62 to 64.

Example 66 is the use of a trained graph neural network model for performing user scheduling in a wireless network.

The term "data" as used herein, for example in relation to "input data" or "output data", may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The term "processor" as used herein may be understood as any kind of technological entity that allows handling of data. The data may be handled according to one or more specific functions that the processor may execute. Further, a processor as used herein may be understood as any kind of circuit, e.g., any kind of analog or digital circuit. A processor may thus be or include an analog circuit, digital circuit, mixed-signal circuit, logic circuit (e.g., a hard-wired logic circuit or a programmable logic circuit), microprocessor (for example a Complex Instruction Set Computer (CISC) processor or a Reduced Instruction Set Computer (RISC) processor), Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. A "processor" may also be a logic-implementing entity executing software, for example any kind of computer program, for example a computer program using a virtual machine code such as for example Java. A "processor" as used herein may also include any kind of cloud-based processing system that allows handling of data in a distributed manner, e.g. with a plurality of logic-implementing entities communicatively coupled with one another (e.g. over the internet) and each assigned to handling the data or part of the data. By way of illustration, an application running on a server and the server can also be a "processor". Any other kind of implementation of the respective functions, which will be described below in further detail, may also be understood as a processor. It is understood that any two (or more) of the processors detailed herein may be realized as a single entity with equivalent functionality or the like, and conversely that any single processor detailed herein may be realized as two (or more) separate entities with equivalent functionality or the like.

The term "system" detailed herein may be understood as a set of interacting elements, the elements may be, by way of example and not of limitation, one or more physical components (e.g., processors, transmitters and/or receivers) and/or one or more digital components (e.g., code segments, instructions, protocols). Generally, the system may include one or more functions to be operated (also referred to as "operating functions") of which each may be controlled for operating the whole system.

The term "model" as used herein may be understood as an algorithm, which provides output data based on input data provided to the model (e.g., any kind of algorithm generating or calculating output data based on input data). A computing system may execute a graph neural network model to progressively improve performance of a specific task. In some aspects, parameters of a graph neural network model may be adjusted during a training phase based on training data. A trained graph neural network model may be used during an inference phase to make estimations or decisions based on input data (e.g., to perform user scheduling). In some aspects, the trained graph neural network model may be used to generate additional training data. An additional graph neural network model may be adjusted during a second training phase based on the generated additional training data. A trained additional graph neural network model may be used during an inference phase to make estimations or decisions based on input data.

The term "memory" as used herein may be understood as a computer-readable medium (e.g., a non-transitory computer-readable medium), in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D) XPoint™, among others, or any combination thereof. Furthermore, it is appreciated that registers, shift registers, processor registers, data buffers, among others, are also embraced herein by the term memory. It is also appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "software" refers to any type of executable instruction, including firmware.

As used herein, a "cell" in the context of telecommunications may be understood as a sector served by a network access node. A wireless network may be distributed over a plurality of cells. Accordingly, a cell may be a set of geographically co-located antennas that correspond to a particular sector of a network access node. A network access node can thus serve one or more cells (or sectors), where the cells are characterized by distinct communication channels. Furthermore, the term "cell" may be utilized to refer to any of a macro cell, micro cell, femto cell, pico cell, etc. An "inter-cell handover" may be understood as a handover from a first "cell" to a second "cell", where the first "cell" is different from the second "cell". "Inter-cell handovers" may be characterized as either "inter-network access node handovers" or "intra-network access node handovers". "Inter-network access node handovers" may be understood as a handover from a first "cell" to a second "cell", where the first "cell" is provided at a first network access node and the second "cell" is provided at a second, different, network access node. "Intra-network access node handovers" may be understood as a handover from a first "cell" to a second "cell", where the first "cell" is provided at the same network access node as the second "cell". A "serving cell" may be understood as a "cell" that a wireless communication device is currently connected to according to the mobile communications protocols of the associated mobile communications network standard. In case a cell is served by a mobile network access node, the cell itself may be non-stationary, e.g. may be a mobile cell.

The present disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the examples described herein. For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Exemplary Cellular Wide Area radio communication technologies that the present disclosure may utilize include, but are not limited to: Long Term Evolution (LTE), Long Term Evolution-Advanced (LTE-A), 5th Generation (5G) communication systems, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UNITS (3G) (Universal Mobile Telecommunications System (Third Generation)), W-CDMA (UNITS) (Wideband Code Division Multiple Access (Universal Mobile Telecommunications System)), HSPA (High Speed Packet Access), HSDPA (High-Speed Downlink Packet Access), HSDPA Plus (HSDPA+), HSUPA (High-Speed Uplink Packet Access), HSUPA Plus (HSUPA+), HSPA+(High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UTRA (UNITS Terrestrial Radio Access), E-UTRA (Evolved UNITS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), WITS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Zigbee, Bluetooth®, Wireless Gigabit Alliance (WiGig) standard, Worldwide Interoperability for Microwave Access (WiMax) (e.g., according to an IEEE 802.16 radio communication standard, e.g., WiMax fixed or WiMax mobile), mmWave standards in general (wireless systems operating at 10-90 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication arrangements such as Intelligent-Transport-Systems, etc. Cellular Wide Area radio communication technologies also include "small cells" of such technologies, such as microcells, femtocells, and picocells. Cellular Wide Area radio communication technologies may be generally referred to herein as "cellular" communication technologies. As used herein, a first radio communication technology may be different from a second radio communication technology if the first and second radio communication technologies are based on different communication standards.

The term "5G" as used herein refers to wireless technologies as provided by the 3GPP and International Telecommunication Union (ITU) standards. This may include spectral use overlapping with the existing LTE frequency range (e.g., 600 MHz to 6 GHz) and also include spectral use in the millimeter wave bands (e.g., 24-86 GHz). Also, the terms 5G, New Radio (NR), or 5G NR may be used interchangeably. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum.

The present disclosure may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor may transmit or receive data over a software-level connection with another processor in the form of radio signals, where radio-layer components carry out the physical transmission and reception, such as radio frequency (RF) transceivers and antennas, and the processors perform the logical transmission and reception over the software-level connection.

The term "communicate" encompasses one or both of transmitting and receiving, i.e., unidirectional or bidirectional communication in one or both of the incoming and outgoing directions. In general, the term "communicate" may include the exchange of data, e.g., unidirectional or bidirectional exchange in one or both of the incoming and outgoing directions.

The term "calculate" encompasses both 'direct' calculations via a mathematical expression/formula/relationship and 'indirect' calculations via lookup or hash tables and other array indexing or searching operations.

As utilized herein, the term "derived from" designates being obtained directly or indirectly from a specific source. Accordingly, data derived from a source includes data obtained directly from the source or indirectly from the source, i.e. through one or more secondary agents.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. For instance, the phrase "a plurality" may be understood to include a numerical quantity greater than or equal to two (e.g., two, three, four, five, [ . . . ], etc.). The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object]

selection", etc., used herein in relation to a quantity of objects is intended to refer to a quantity of one or more of said objects. It is appreciated that unless directly referred to with an explicitly stated plural quantity (e.g. "two [objects]", "three of the [objects]", "ten or more [objects]", "at least four [objects]", etc.) or express use of the words "plural", "multiple", or similar phrases, references to quantities of objects are intended to refer to one or more of said objects.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

As used herein, a signal (e.g., data) that is "indicative of" or "representative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" or "representative of" some quantity, state, or parameter may be physically embodied as a digital signal, an analog signal, or stored bits that encode or otherwise communicate the value.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes, which come within the meaning and range of equivalency of the claims, are therefore intended to be embraced.

What is claimed is:

1. A device for use in a wireless network, the device comprising:
    a processor configured to:
    provide input data to a trained graph neural network model, the input data being representative of a graph representation of a plurality of wireless communication devices,
    wherein the graph representation comprises a plurality of nodes associated with the plurality of wireless communication devices, and a plurality of edges associated with interactions among the plurality of wireless communication devices,
    wherein each node of the plurality of nodes has an input feature vector associated therewith, the input feature vector being representative of one or more features of the wireless communication device associated with the node,
    wherein the trained graph neural network model is configured to provide output data representative of a scheduled user set comprising the plurality of wireless communication devices; and
    instruct user scheduling of the plurality of wireless communication devices based on the output data of the trained graph neural network model.

2. The device according to claim 1,
    wherein the output data comprises a set of scores, and
    wherein each score of the set of scores is associated with a wireless communication device of the plurality of wireless communication devices.

3. The device according to claim 1,
    wherein the input data comprises correlation data representative of a correlation among the wireless communication devices of the plurality of wireless communication devices.

4. The device according to claim 3,
    wherein the correlation data comprises a pairwise signal-to-interference-plus-noise ratio among the wireless communication devices.

5. The device according to claim 1,
    wherein the plurality of nodes comprises, for each wireless communication device of the plurality of wireless communication devices, a number of nodes corresponding to a number of layers associated with the wireless communication device.

6. The device according to claim 1,
    wherein the graph representation comprises a respective graph representation for each sub-band of a resource block group of one or more resource block groups of the wireless network.

7. The device according to claim 6,
    wherein each graph representation comprises, for each wireless communication device of the plurality of wireless communication devices, a number of nodes corresponding to a number of layers associated with the wireless communication device in the respective sub-band.

8. The device according to claim 1, wherein the one or more features of the wireless communication device comprise one or more of: layer signal-to-interference-and-noise ratio, a user weight, a precoding vector, and/or combinations thereof.

9. The device according to claim 1, wherein each node of the plurality of nodes is connected with each other node of the plurality of nodes.

10. The device according to claim 1, wherein the graph representation further comprises a virtual node not associated with any wireless communication device of the plurality of wireless communication devices.

11. The device according to claim 1, wherein an edge between a node of the plurality of nodes and an other node of the plurality of nodes is associated with channel state information of the node and of the other node.

12. The device according to claim 11, wherein the channel state information comprises one or more of: single-user Multiple-Input Multiple-Output precoding matrix indicator per sub-band; single-user Multiple-Input Multiple-Output beamformer; channel quality indicator per layer per sub-band; and/or rank indicator.

13. The device according to claim 1, wherein the graph representation further comprises a plurality of attention scores, each attention score being representative of a weighted relationship between a node of the plurality of nodes and another node of the plurality of nodes.

14. The device according to claim 1, wherein the trained graph neural network model is configured as a xAPP in a radio access network intelligent controller, or wherein the processor is configured to access the trained graph neural network model in a distributed unit of a radio access network of the wireless network.

15. A method of operating a wireless network, the method comprising:
providing input data to a trained graph neural network model, the input data being indicative of a graph representation of a plurality of wireless communication devices,
wherein the graph representation comprises a plurality of nodes associated with the plurality of wireless communication devices, and a plurality of edges associated with interactions among the plurality of wireless communication devices,
wherein each node of the plurality of nodes has an input feature vector associated therewith, the input feature vector being representative of one or more features of the wireless communication device associated with the node,
wherein the trained graph neural network model is configured to provide output data representative of a scheduled user set comprising the plurality of wireless communication devices; and
performing user scheduling of the plurality of wireless communication devices based on the output data of the trained graph neural network model.

16. The method according to claim 15, wherein the output data comprises a set of scores, wherein each score of the set of scores is associated with a wireless communication device of the plurality of wireless communication devices, and wherein performing user scheduling comprises allocating resources to the plurality of wireless communication devices in descending order of associated scores.

17. A device for use in a wireless network, the device comprising:
a processor configured to:
provide input data to a trained graph neural network model, the input data being representative of a graph representation of a plurality of wireless communication devices,
wherein the graph representation comprises a plurality of nodes associated with the plurality of wireless communication devices, and a plurality of edges associated with interactions among the plurality of wireless communication devices,
wherein the input data comprises correlation data representative of a correlation among the wireless communication devices of the plurality of wireless communication devices,
wherein the correlation data comprises a pairwise signal-to-interference-plus-noise ratio among the wireless communication devices,
wherein the trained graph neural network model is configured to provide output data representative of a scheduled user set comprising the plurality of wireless communication devices; and
instruct user scheduling of the plurality of wireless communication devices based on the output data of the trained graph neural network model.

* * * * *